United States Patent [19]

Mager et al.

[11] 4,141,068
[45] Feb. 20, 1979

[54] AUXILIARY ROM MEMORY SYSTEM

[75] Inventors: George E. Mager, Manhattan Beach; Frank M. Nelson, Sherman Oaks; Steven L. Reid, Redondo Beach; Philip Richardson, Pacific Palisades; Vernon E. Rochat, Palos Verdes, all of Calif.; Donald S. Post, Fairport, N.Y.

[73] Assignee: Xerox Corporation, Stamford, Conn.

[21] Appl. No.: 780,875

[22] Filed: Mar. 24, 1977

[51] Int. Cl.² .................................................. G06F 13/00
[52] U.S. Cl. ...................................................... 364/200
[58] Field of Search ... 364/200 MS File, 900 MS File

[56] References Cited

U.S. PATENT DOCUMENTS

| | | | |
|---|---|---|---|
| 3,839,705 | 10/1974 | Davis et al. | 364/200 |
| 3,959,776 | 5/1976 | Morley | 364/200 |
| 3,972,028 | 7/1976 | Weber et al. | 364/200 |
| 3,984,813 | 10/1976 | Chung | 364/200 |
| 4,021,783 | 5/1977 | Highberger | 364/900 |

Primary Examiner—Raulfe B. Zache
Attorney, Agent, or Firm—Ronald L. Taylor

[57] ABSTRACT

An auxiliary ROM memory system which is hierarchied for providing for the contingency of additional read-only memory control program storage requirements in excess or in lieu of the predetermined ROM memory provided on-board a microprocessor based central processing unit module, and a read-only memory altering capability utilizing programmable read-only memory to expedite the implementation/installation of changes to the ROM bit patterns. The alterable PROM storage comprises bulk PROM memory including a first PROM set that is mutually exclusive as to existing on-board ROM memory for addressably branching to code extensions and/or in-line code insertions, and/or a second PROM set that is mutually inclusive as to existent on-board and contingent ROM memory for decodably addressing large-scale code overlays thereto. In addition, the alterable PROM storage comprises patch PROM for addressing, through multi-leveled decoding, small-scale code overlays to the on-board and contingent ROM memory for single in-line bit pattern alterations. Conflicting memory requests involving addresses recognized by more than one of the supra memory categories, when enabled, are presented to a predetermined hierarchy of memory precedences for resolution thereof. Each of the enumerated memory categories of the auxiliary ROM memory system may be operative to have its population incremented or decremented without invalidating the above hierarchy of addressing.

68 Claims, 33 Drawing Figures

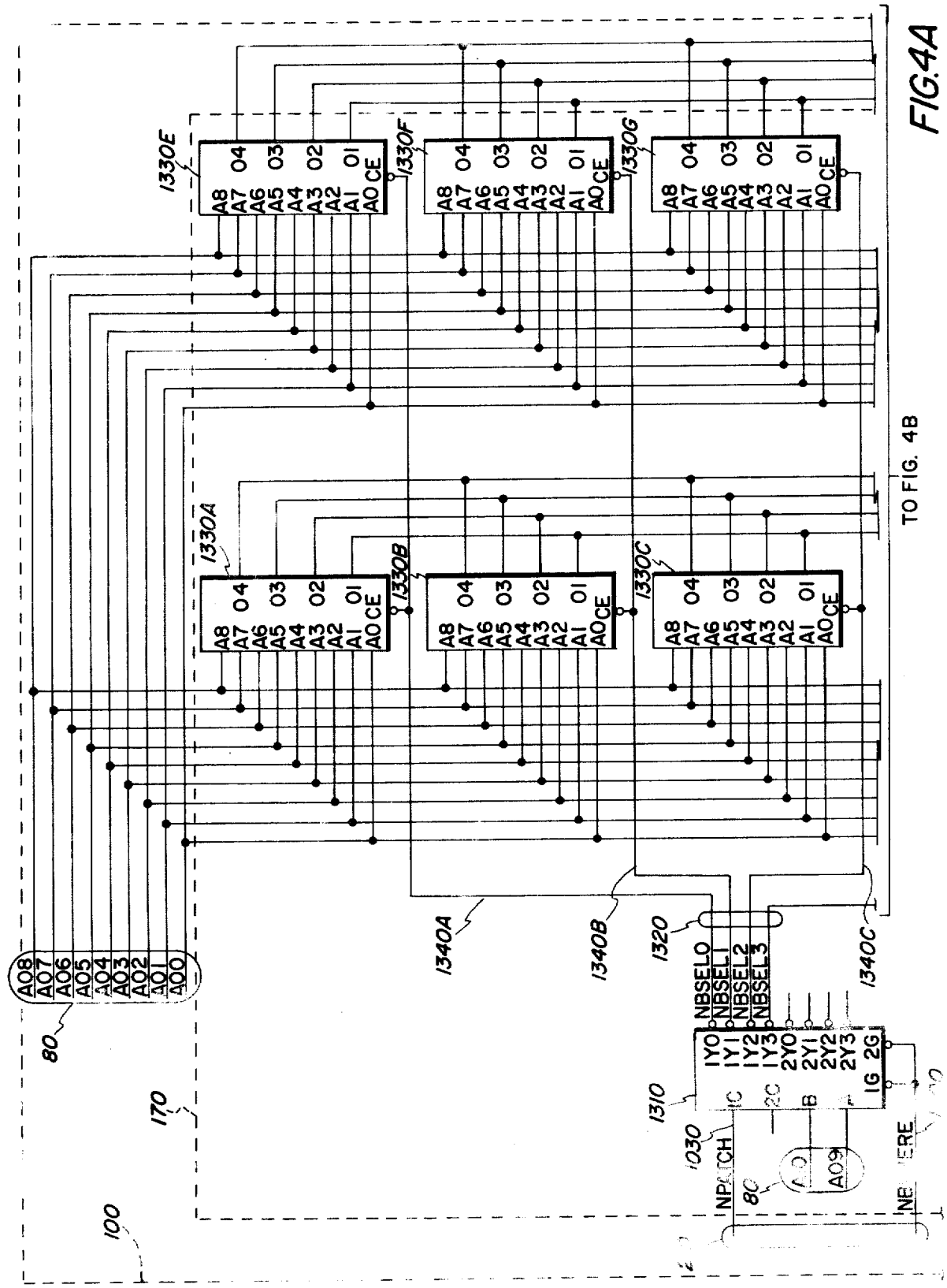

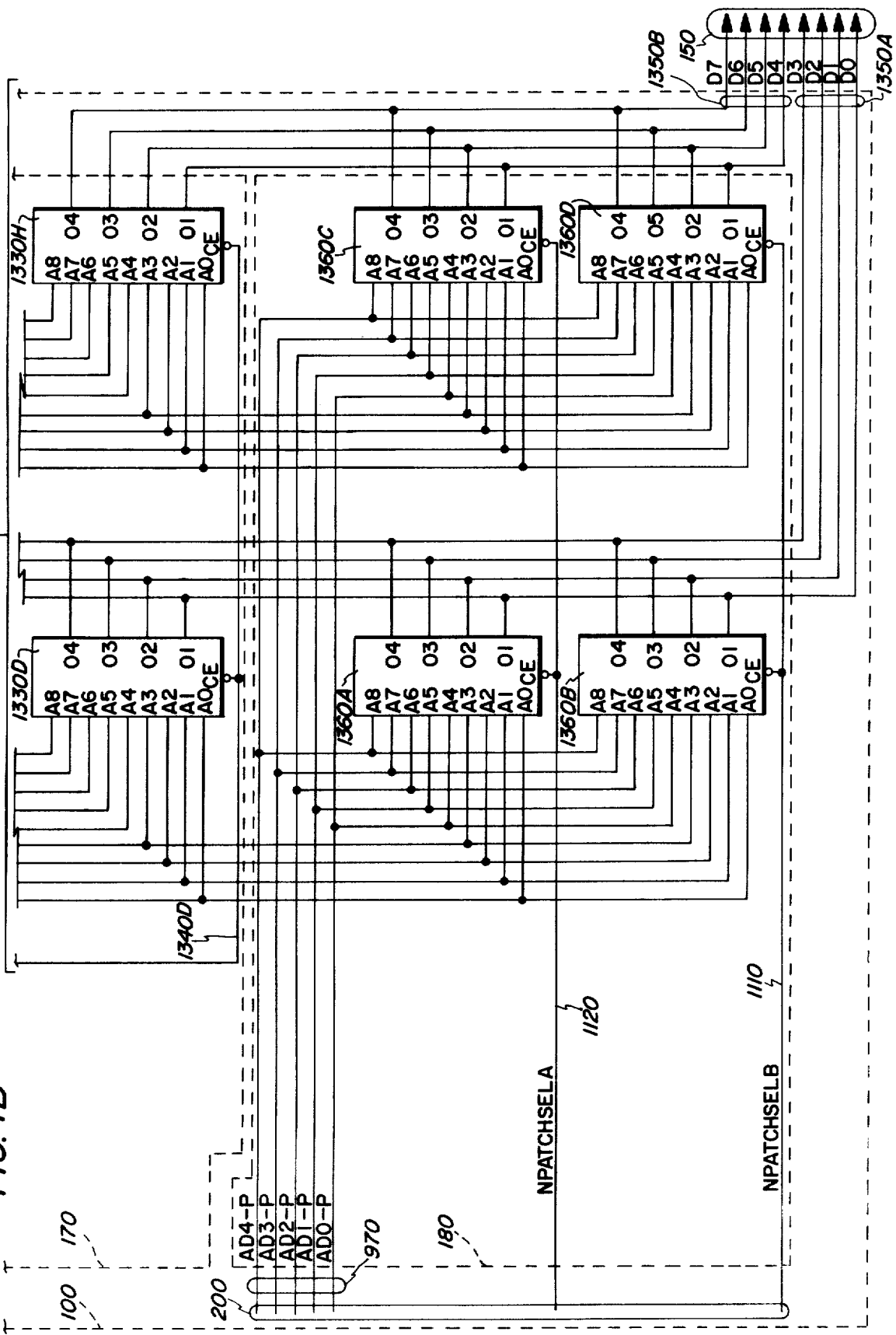

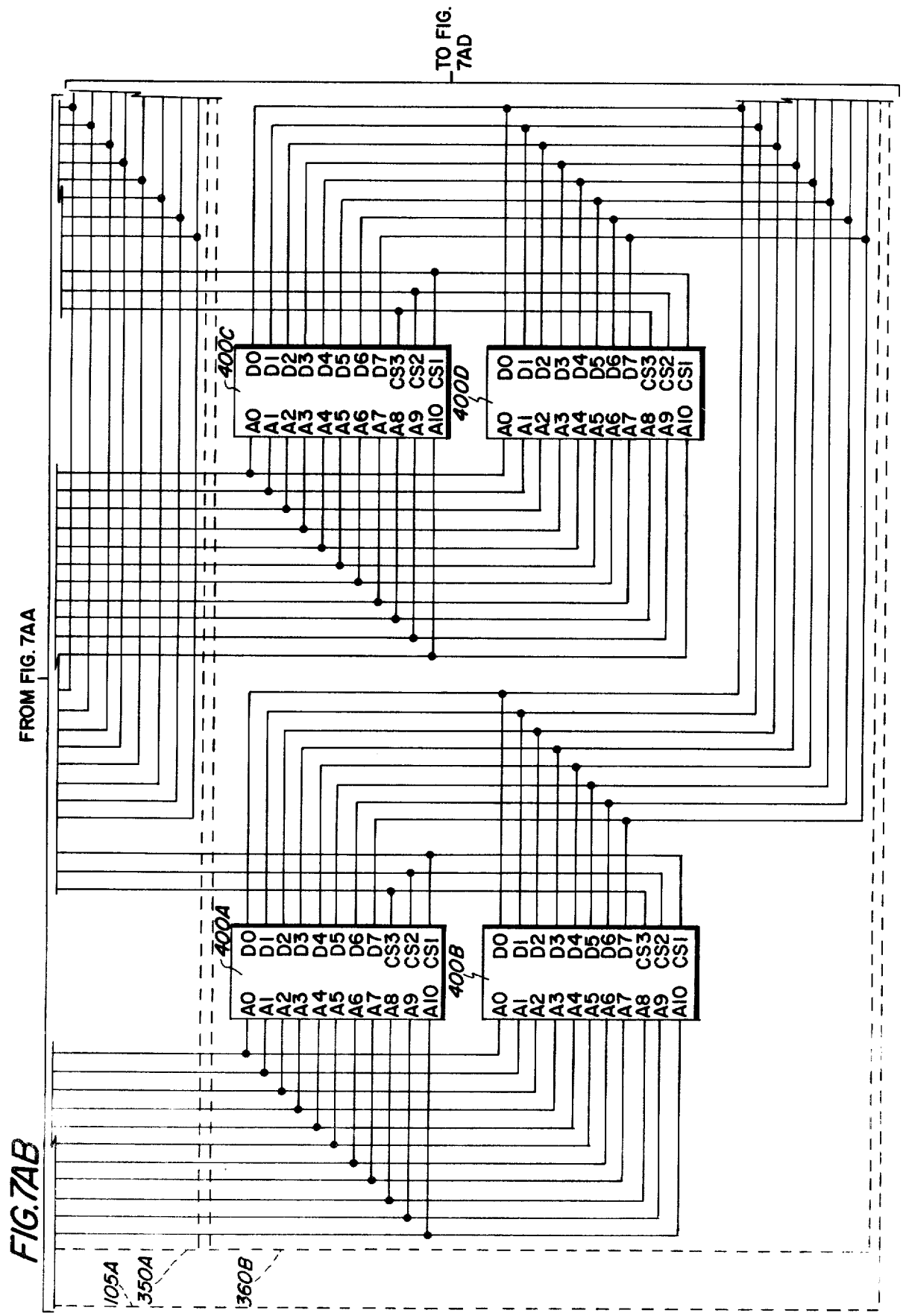

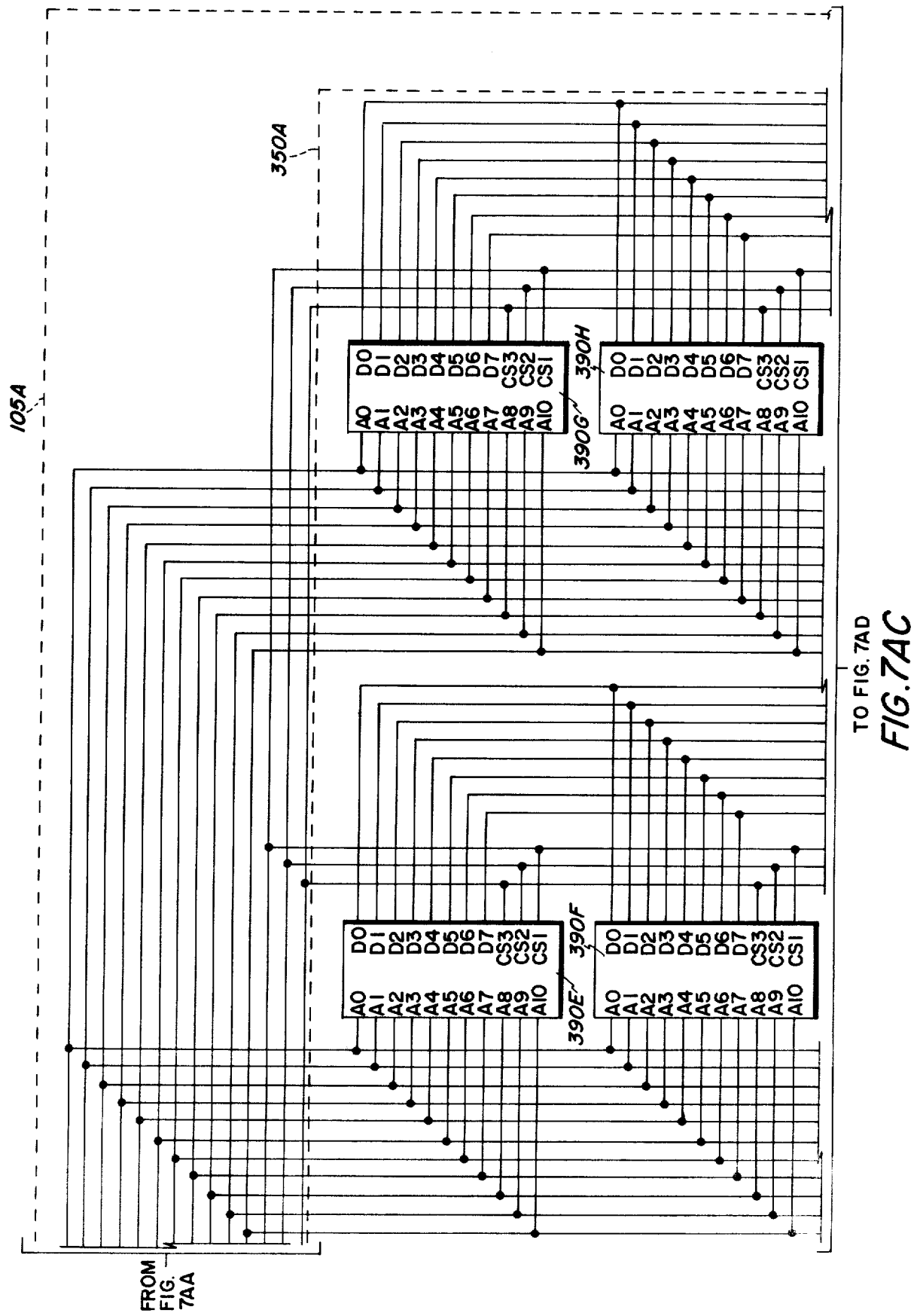

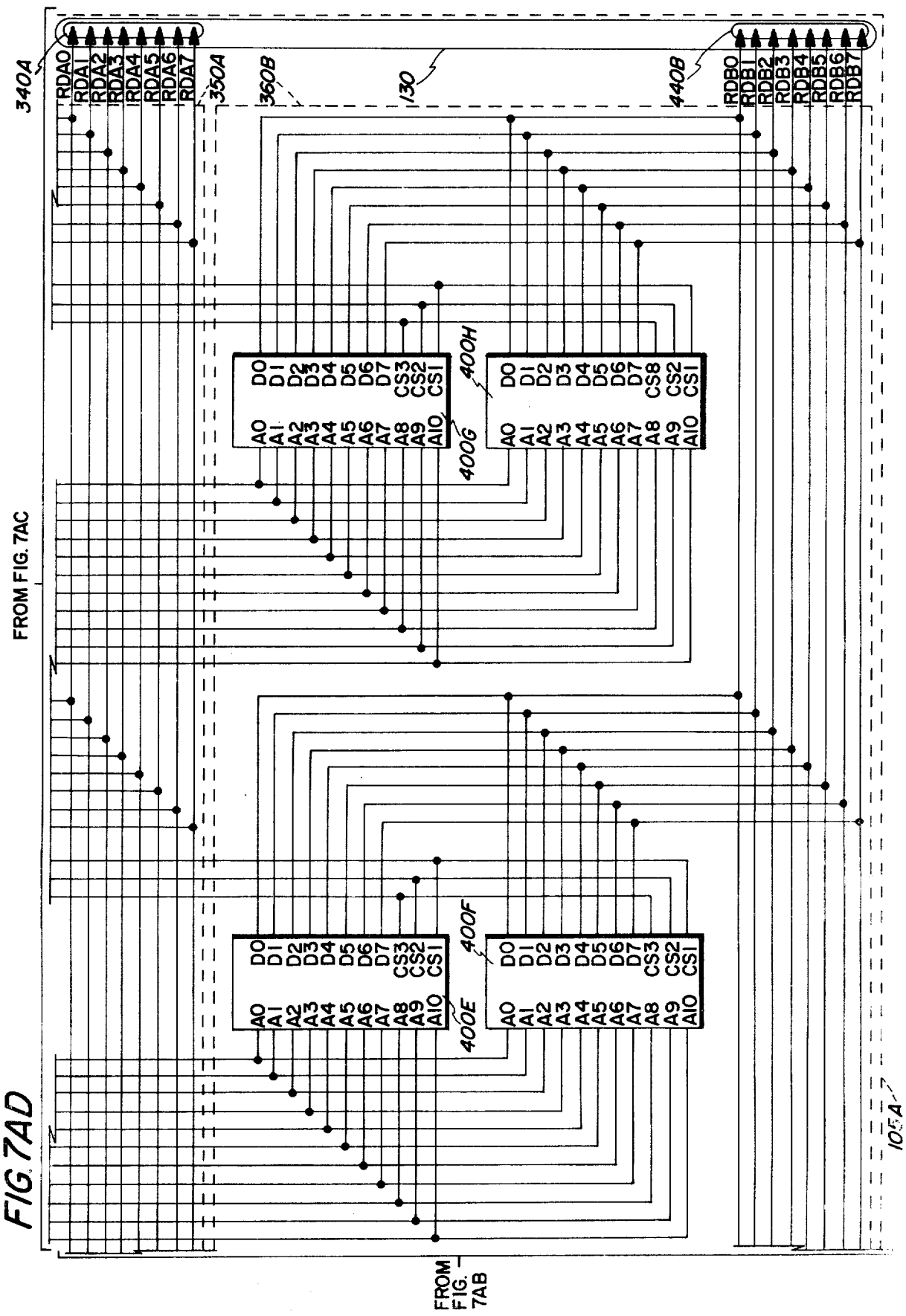

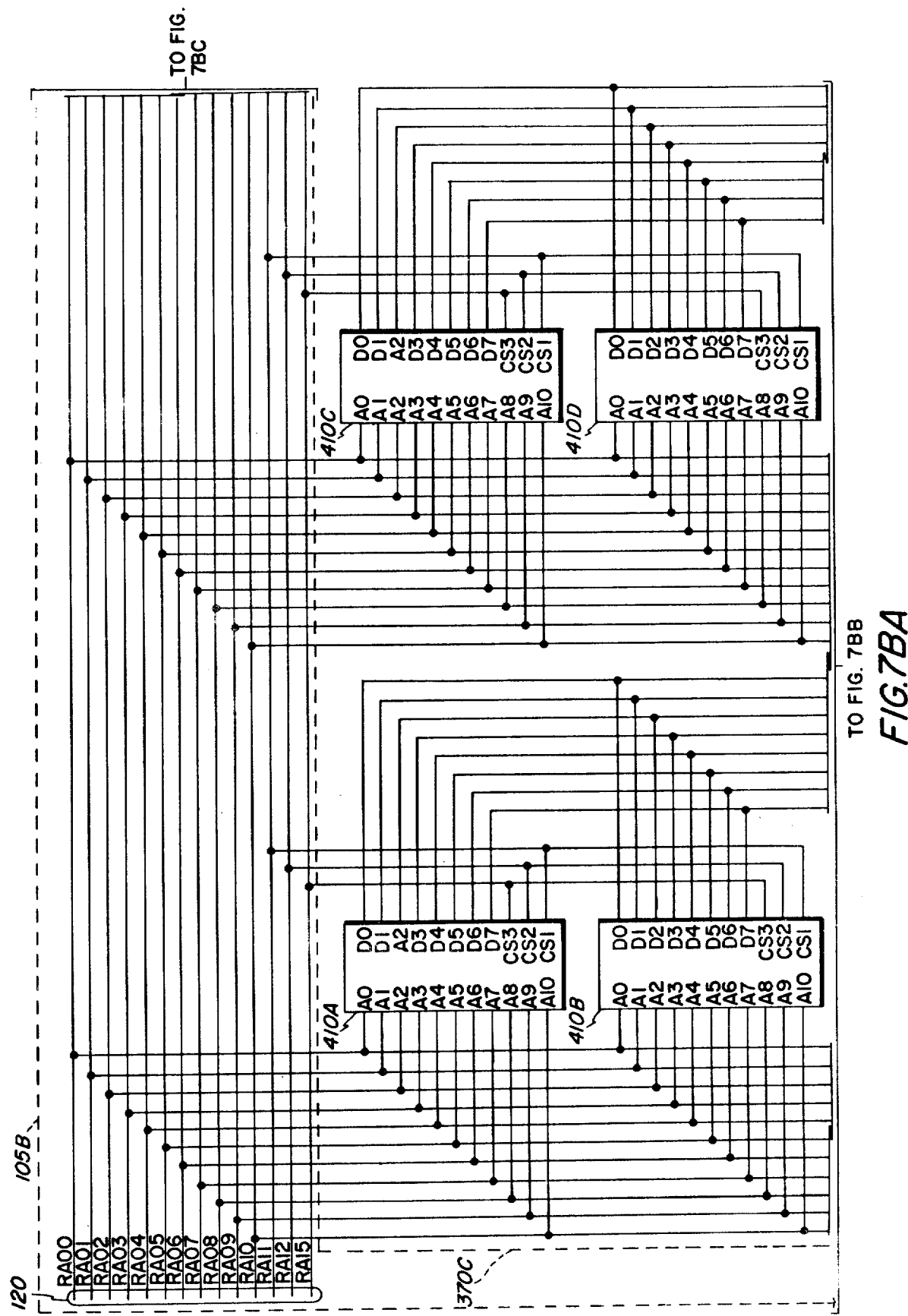

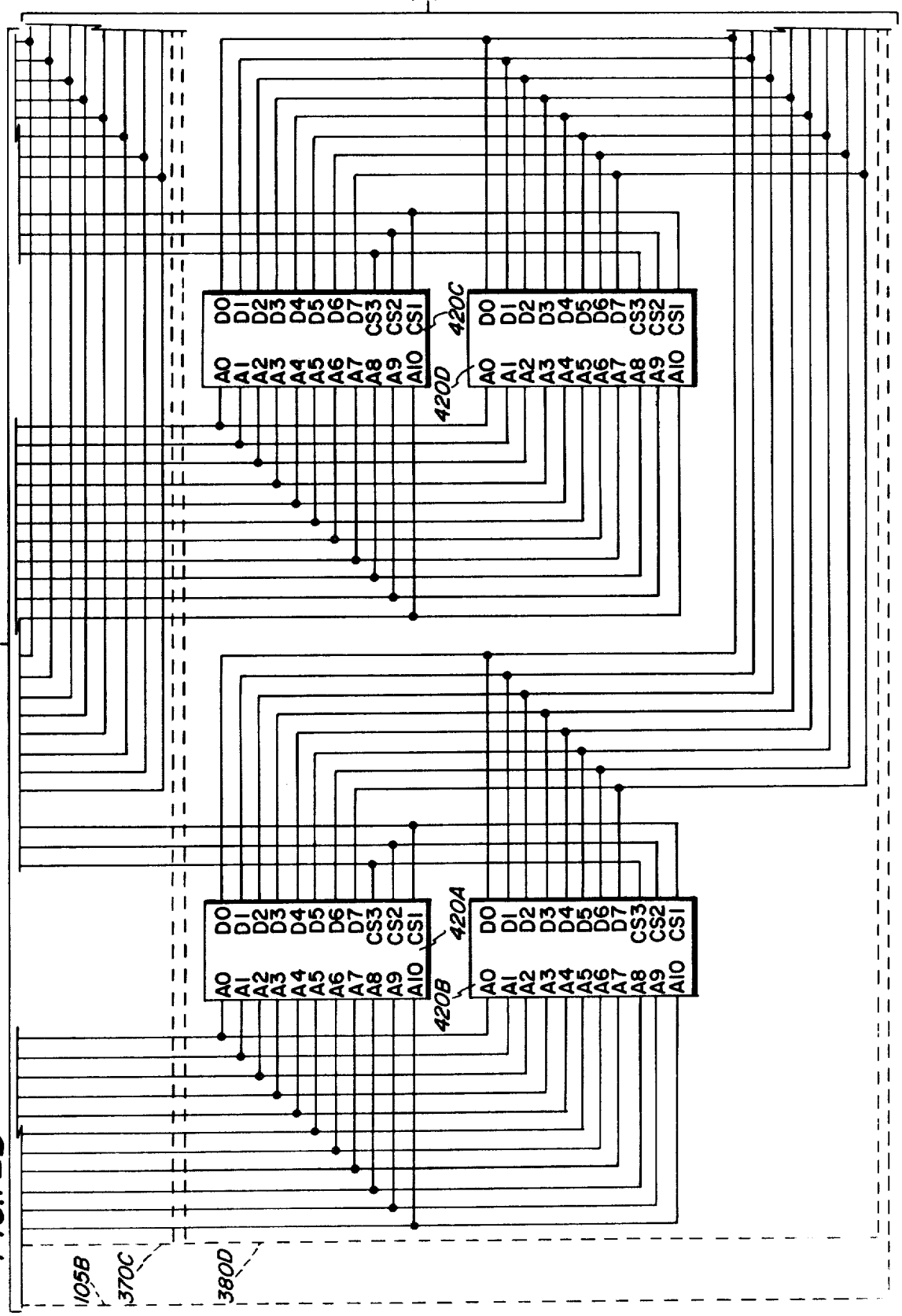

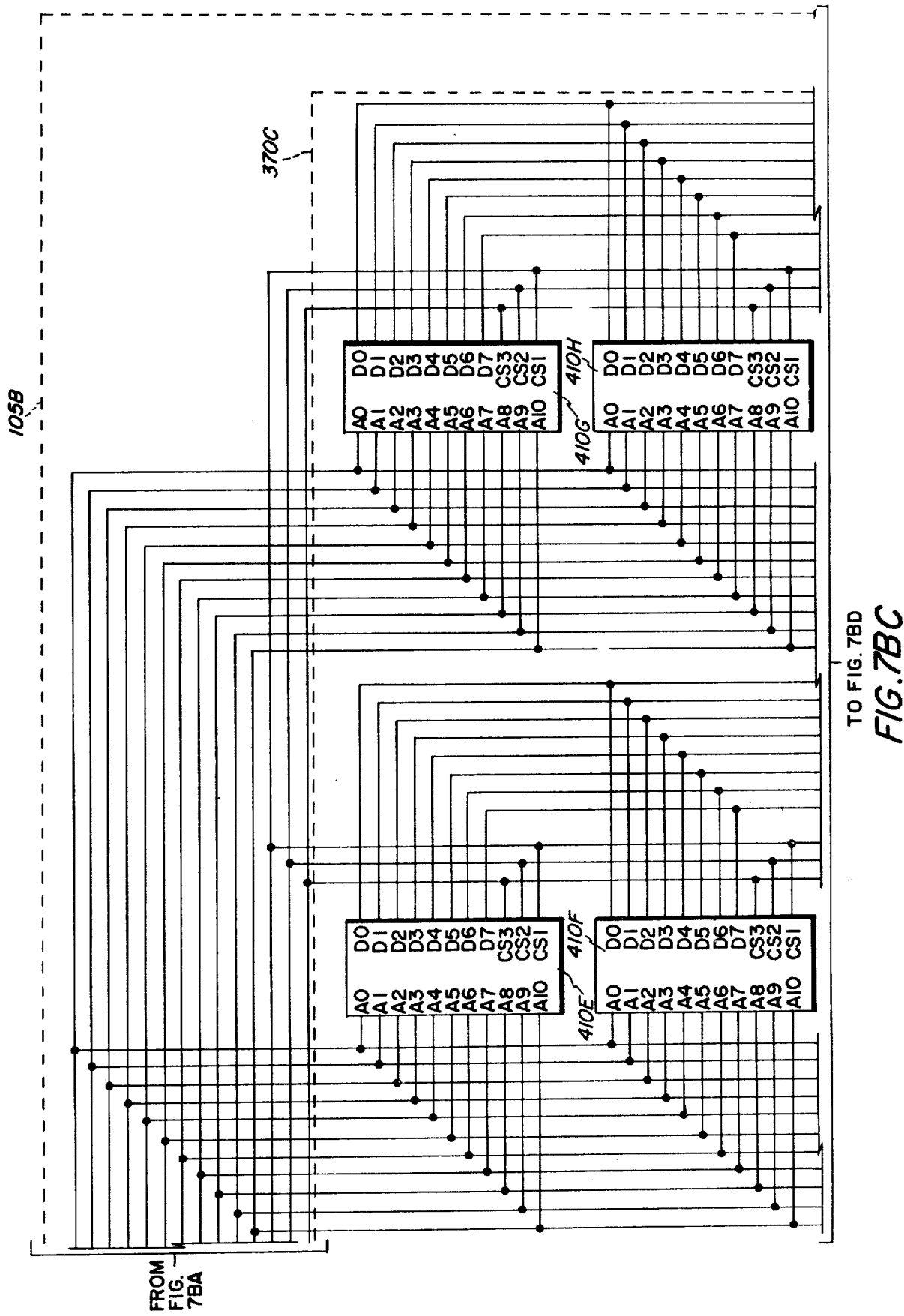

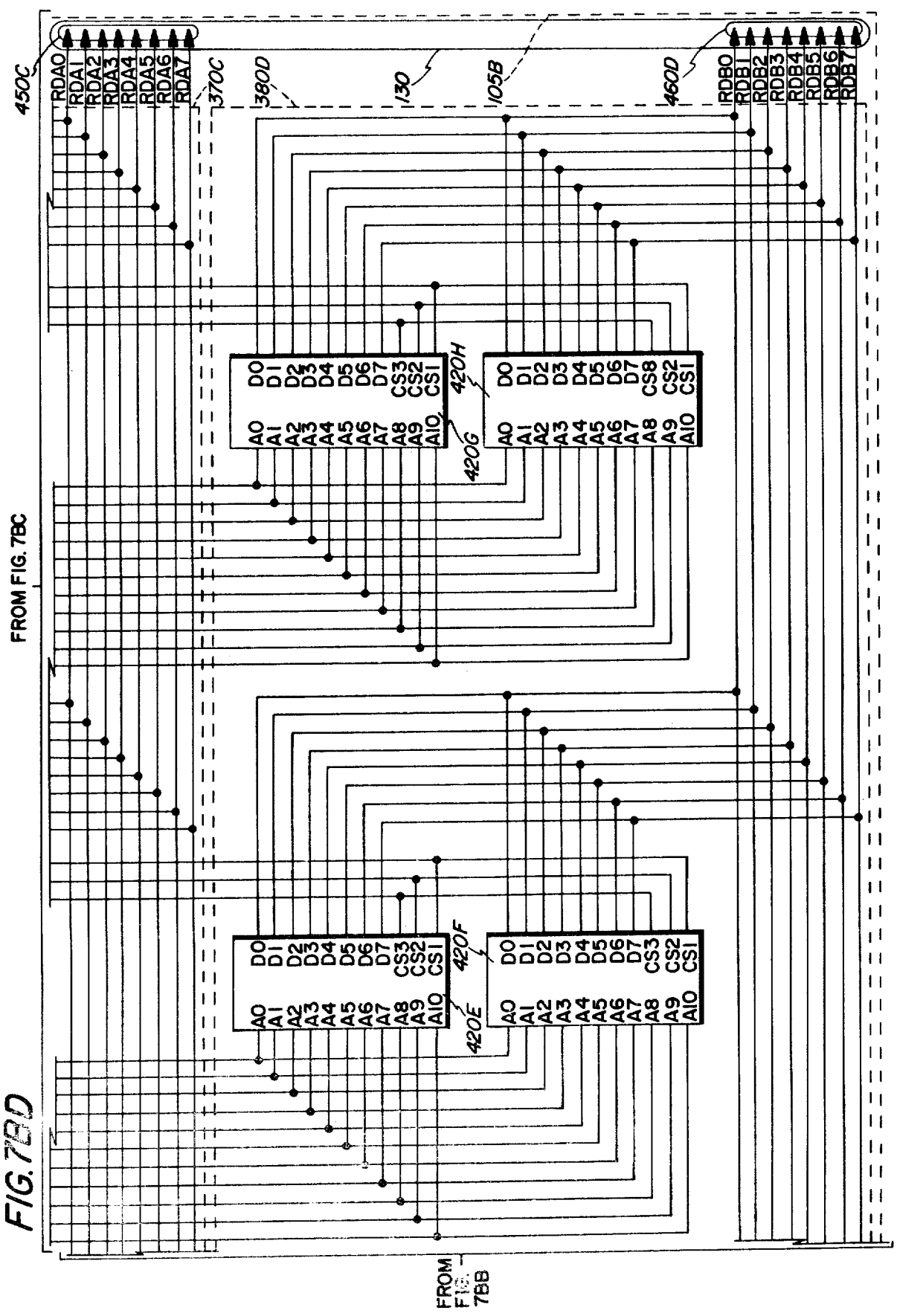

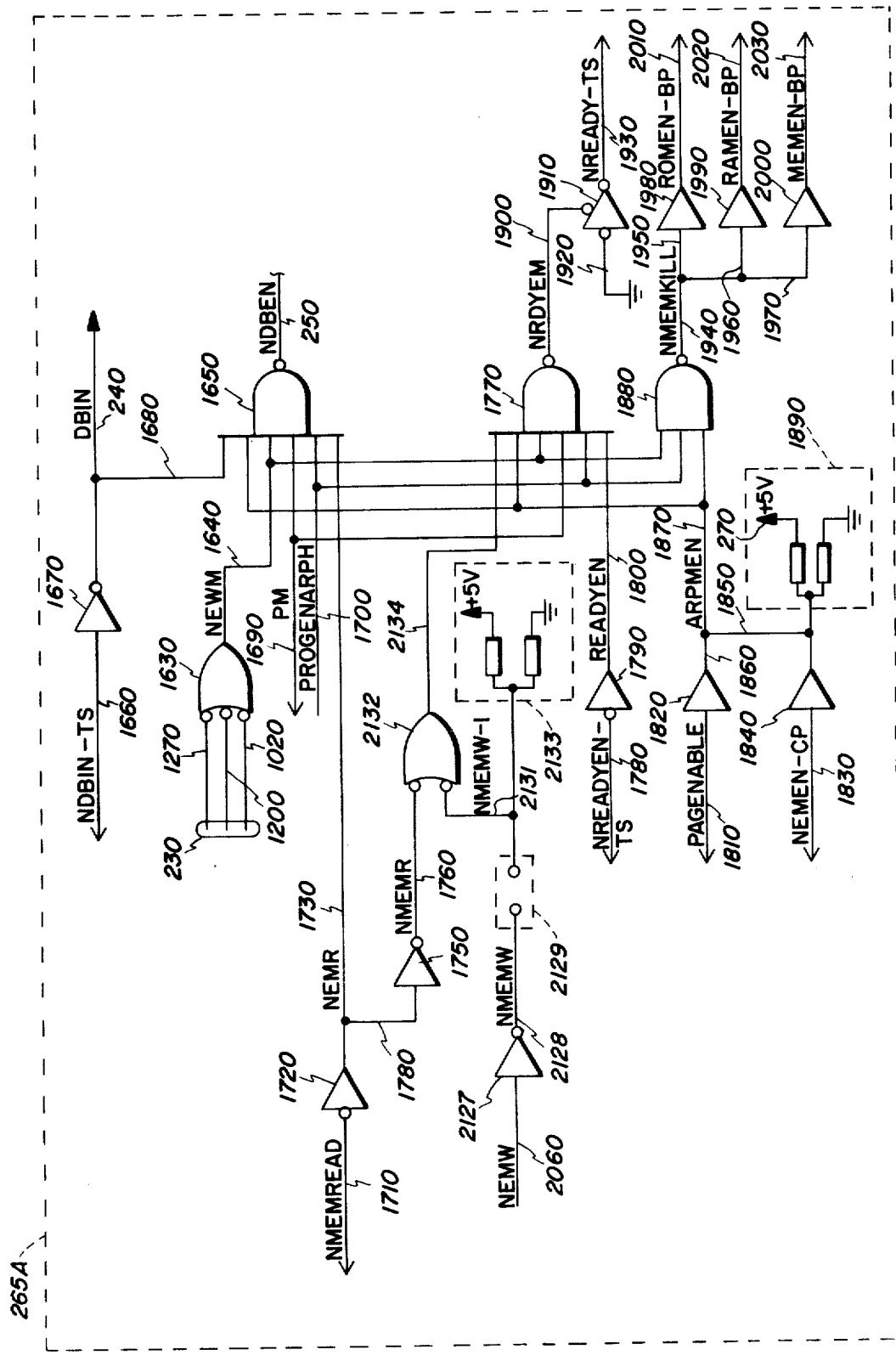
FIG. IIB

| ADDRESS LINES (3160) | ROM (3170) | BLUK PROM (3180) | LVL2 GRP# (3190) | ADDRESS LINES | ROM | BULK PROM | LVL2 GRP# | ADDRESS LINES | ROM | BULK PROM | LVL2 GRP# |
|---|---|---|---|---|---|---|---|---|---|---|---|
| XXXX-XXXX | X | X | XX | XXXX-XXXX | X | X | XX | XXXX-XXXX | X | X | XX |
| 0000-007F | 1 | — | 34 | | | | | | | | |
| 0080-00FF | — | — | 35 | | | | | | | | |
| 0100-017F | — | — | 30 | | | | | | | | |
| 0600-067F | — | 0 | 36 | | | | | | | | |
| 0680-06FF | — | 0 | 3F | | | | | | | | |
| 0780-07FF | — | 0 | 39 | | | | | | | | |
| 0780-07FF | — | — | 3F | | | | | | | | |
| 2000-207F | 0 | — | 3F | | | | | | | | |
| 2080-20FF | 0 | — | 32 | | | | | | | | |
| 2100-217F | 0 | — | 31 | | | | | | | | |
| 2180-21FF | 0 | — | 3A | | | | | | | | |
| 2200-227F | 0 | — | 3F | | | | | | | | |
| 2280-22FF | 0 | — | 37 | | | | | | | | |
| 2300-037F | 0 | — | 33 | | | | | | | | |
| 2380-23FF | 0 | — | 38 | | | | | | | | |

32 X 4 = 128 ADDRESS LINE / PAGE

FIG. 16

| 3210 | 3220 | 3230 | | | |
|---|---|---|---|---|---|
| ADDRESS LINES | LVL2 GRP# | PATCH PROM ADDR | ADDRESS LINES | LVL2 GRP# | PATCH PROM ADDR |
| XXXX-XXXX | XX:X | XX | XXXX-XXXX | XX:X | XX |
| 0100 - 010F | 30:0 | 38 | | | |
| 0110 - 011F | 30:1 | 24 | | | |
| 2130 - 213F | 31:3 | 39 | | | |
| 20L0 - 20EF | 32:6 | 3A | | | |
| 2300 - 230F | 33:0 | 3B | | | |
| 0000 - 000F | 34:0 | 3C | | | |
| 00A0 - 00AF | 35:2 | 3D | | | |
| 0610 - 061F | 36:1 | 3E | | | |
| 2280 - 228F | 37:0 | 3F | | | |
| 2380 - 238F | 38:0 | 20 | | | |
| 0740 - 074F | 39:4 | 21 | | | |
| 2180 - 218F | 3A:0 | 22 | | | |
| 2190 - 219F | 3A:1 | 23 | | | |

FIG. 17

```
000    XXXX    XXXX ...          (32 BYTES)
020
 .
 .
 .
1E0
200 ⎫
 .  ⎪
 .  ⎬ AS REQUIRED
 .  ⎪
2E0 ⎭
```

*FIG. 18*

|  | COUNT | |
|---|---|---|
| | | a = 0 OR 1 |
| | | b = 0 OR 2 |
| DECODE LEVEL 1 (750) | 7 - 4 | a |
| DECODE LEVEL 1 (750) | 3 - 0 | a |
| DECODE LEVEL 2 (920) | 7 - 4 | a |
| DECODE LEVEL 2 (920) | 3 - 0 | a |
| PATCH PROM     (180) | 0 - 511 | b |
|  | 512 - 1023 | b |
|  |  |  |
| BULK PROM (170) | 0 - 511 | b |
|  | 512 - 1023 | b |
|  | 1024 - 1535 | b |
|  | 1536 - 2047 | b |
| TOTAL PROM COUNT(750,920,170,180) | | c | c = ≤a≤b

TOTAL PATCH PROM(180) USED: XXXX BYTES, XX PATCHES
TOTAL BULK PROM (170) USED: XXXX BYTES
NUMBER OF 128 16-BYTE AREAS PATCHED (MAX=63): XX
C ROM (105A-B) COUNT = XX

*FIG. 19*

THE FOLLOWING CODE IN THE PATCH FILE WOULD GENERATE THE PATCH PROM MAP 3250 SHOWN BELOW.

| 3260<br>SOURCE<br>PATCH NO. | 3270<br>OBJECT<br>PATCH NO. | PATCH : | SYSTEM<br>SET<br>ORIGIN<br>JMP<br>ORIGIN<br>STA<br>MOV<br>JMP<br>ORIGIN<br>JMP<br>ORIGIN<br>MVI<br>JMP<br>ORIGIN<br>DB<br>END | I8080<br>X'2CI'<br>X'4000'<br>X'4000'<br>X'300'<br>A,M<br>X'2C4'<br>X'I6F'<br>X'4010'<br>X'4010'<br>A,5<br>X'176'<br>2CE<br>6 | ASSUME ALL PATCH<br>ADDRESSES ARE IN<br>PATCH DATA PROM. |
|---|---|---|---|---|---|
| 1 | 1 | | | | |
| 2 | 2 | | | | |
| 3 | 3,4 | | | | |
| 4 | 5 | | | | |
| 5 | 1 | | | | |

| 3260<br>SOURCE<br>PATCH NO. | 3270<br>OBJECT<br>PATCH NO. | 3280<br>OBJECT PATCH<br>ADDRESS | 3290<br>PROM<br>ADDRESS | 3300<br>16-BYTE<br>REPEAT | 3310<br>BYTE<br>REPEAT |
|---|---|---|---|---|---|
| 1 | 1 | 02C0 | 0180 | | |
| 2 | 2 | 4000 | 0190 | | |
| 3 | 3 | 0160 | 01A0 | | |
| 3 | 4 | 0170 | 01B0 | | |
| 4 | 5 | 4010 | 01C0 | | |
| 5 | 1 | 2C0 | 0180 | 5 | |

FIG. 21

| | | |
|---|---|---|
| COL. | 1-2 | RO READ ONLY MAP |
| | | RW READ WRITE MAP |
| | | IF BLANK OR IN ERROR, RW IS ASSUMED |
| | 3 | BLANK |
| | 4-6 | REL RELOCATABLE OR ABSOLUTE. IF BLANK OR ABS IN ERROR, RELOCATABLE IS ASSUMED. |
| | 7 | BLANK |
| | 8-11 | STARTING BYTE ADDRESS IN HEXADECIMAL |
| | 12 | BLANK |
| | 13-16 | ENDING BYTE ADDRESS IN HEXADECIMAL |
| | 17 | BLANK |
| | 18-21 | ROUND VALUE IN HEXADECIMAL. THE SECTIONS IN THIS RANGE WILL BE ROUNDED TO A MULTIPLE OF THIS VALUE OR TO THE TOP OF RANGE. 0 OR 1 WILL INHIBIT ROUNDING. |
| | 22 | BLANK |
| | 23 | FILL VALUE. UNFILLED MEMORY DUE TO DS AND ORIGIN DIRECTIVES ARE FILLED WITH THE SPECIFIED, THE AREA REMAINS UNFILLED. IF N IS SPECIFIED, THE START-END MEMORY WILL NOT BE LOADED. N IS USED TO VOID AN ABSOLUTE SECTION THAT WOULD HAVE BEEN LOADED IN THE START-END MEMORY. |
| | 24 | BLANK |
| | 25 | CHECKSUM LENGTH (1-4) |
| | 26 | BLANK |
| | 27 | P FOR POSITIVE SUM, N FOR NEGATIVE SUM |
| | 28 | BLANK |
| | 29 | MEMORY RANGE OF CHECKSUM S FOR SINGLE MODULE, R FOR THIS RANGE ONLY OR LAST OF A CONTINUATION, C FOR CONTINUE TO THE NEXT RANGE |
| | 30 | BLANK |
| | 31-34 | AN ABSOLUTE ADDRESS (CHECK ADDRESS) OR BLANK |

FIG. 22

AUXILIARY ROM MEMORY SYSTEM

CROSS-REFERENCE TO A RELATED PATENT

A patent application entitled "Controller Direct Memory Access" bearing application Ser. No. 758,117, and filed on Jan. 10, 1977, by George E. Mager et al., and assigned to Xerox Corporation, describes and claims a microprocessor based CPU module upon which the present invention is an adjunct thereof.

BACKGROUND OF THE INVENTION

A. Field of the Invention

The invention relates generally to read-only memories for microprocessor based CPU modules and more particularly to hierarchied auxiliary ROM memory systems for additions and alterations to on-board ROM.

B. Description of the Prior Art

Previously, read-only memories for a microprocessor based CPU module could only be on-board mask programmable ROMS and/or relatively expensive field programmable PROMS. If an addition or alteration was needed to be made to the application program stored in the on-board memory, the whole board would have to be pulled and discarded in the case of mask programmable ROMS, or alternatively additions and alterations to code could be had only in a limited manner according to the amount of unused existing on-board memory in the case of PROMS. The former was expensive due to the microprocessor peripheral content and the latter equally unacceptable due to the large amount of highly skilled labor required to carefully pull, reprogram, and replace the CPU module board containing the ROM memory.

Even in those cases where there exists a rudimentary external memory board that has ROMS and/or PROMS that may be coupled through a system bus to the CPU module board, there still remains the problem of how to address, in a coherent hierarchal manner, the various categories of memory used for extension, insertion, large-scale overlay, and small-scale overlay while still retaining the flexibility required to increment and/or decrement the memory population as the need arises.

SUMMARY OF THE INVENTION

Accordingly, it is an important object of the invention to provide an auxiliary ROM memory system having a plurality of memory categories for the storage of various types of additions and/or alterations of code to ROM that is on-board the microprocessor based CPU module.

A further object of the present invention is to provide efficient hierarchal resolution of conflicting CPU memory requests in a predetermined manner involving addresses recognized by more than one of the plurality of categories of memory in the auxiliary ROM memory system.

It is another object of the present invention to provide additional contingency ROM storage as a category of the auxiliary ROM memory system for program storage in excess of or in lieu of the on-board ROM memory in the CPU module.

Another further object of the present invention is to provide alterable PROM storage as a category of the auxiliary memory system for implementation and installation of code changes to the program stored in contingent ROM and on-board the ROM memory in the CPU module.

Yet another object of the present invention is to provide bulk PROM as a subset of the alterable PROM storage for extensions or in-line insertions of code for the revision of program storage residing in on-board ROMS.

A further object of the present invention is to provide patch PROM as a subset of the alterable PROM storage for single in-line bit pattern alterations of code for the revision of on-board ROM program storage.

A yet further object of the present invention is to provide small-scale code overlay of the on-board ROM through multi-leveled address decoding of the patch PROM.

Another further object of the present invention is to provide bulk PROM extensions and insertions to on-board ROM that are mutually exclusive relative thereto through logical branching.

A further object of the present invention is to provide bulk PROM large-scale code overlays to on-board ROM that are mutually inclusive relative thereto through address decoding.

In carrying out the objects of the invention, address signals are transmitted on a system bus from the CPU module to a driver means in the auxiliary ROM memory system having tri-state control. Address signals are then controllably distributed to a buffer module for addressing a contingent ROM memory, a multiplexer for block selection of accessed instructions, alterable PROM for addressing sections of memory to be accessed therefrom, a decoder control module for multilevel hierarchal accessing of all categories of memory in the auxiliary ROM memory system, and a ready control module for interfacing through the system bus with the CPU module for temporally controlled reading of the auxiliary ROM memory system. Accessed instruction signals are received from the supra contingent ROM multiplexer and the alterable PROM memory for tri-state driving through the system bus to the supra ready control module and the CPU module.

BRIEF DESCRIPTION OF THE DRAWINGS

Various other objects, advantages and meritorious features of the invention will become more fully apparent from the following specification, appended claims and accompanying drawing sheets.

The features of the specific embodiment of the invention are illustrated in the drawings in which:

FIGS. 4A and 4B is a schematic diagram of the alterable PROM memory of the auxiliary ROM memory system of FIG. 1;

FIG. 16 is a First Level Decode Listing of the Printer File of FIG. 15;

FIG. 17 is a Second Level Decode Listing of the Printer File of FIG. 15;

FIG. 18 is a Patch Prom Memory Image Listing of the Printer File of FIG. 15;

FIG. 19 is an ARMS Summary Report Listing of the Printer File of FIG. 15;

FIG. 21 is an Exemplary Table of the Patch Prom Map for the Printer File of FIG. 15; and FIG. 22 is an appendix of the format of a MAP File Record of FIG. 15.

DETAILED DESCRIPTION OF THE PREFERRED EMBODIMENT

Referring to FIGS. 1 through 14 by the characters of reference, there is illustrated a system utilizing MOS and TTL technology for carrying out the objects of the invention. As indicated supra, the inventive auxiliary ROM memory system (ARMS) 10 is an adjunct of the Central Processor Unit module (CPUM) (not shown) described in a patent application entitled "Controller Direct Memory Access" bearing application Ser. No. 758,117 and filed on Jan. 10, 1977, and assigned to the same corporation, and which is connected thereto via a system bus 20.

Figure 1:
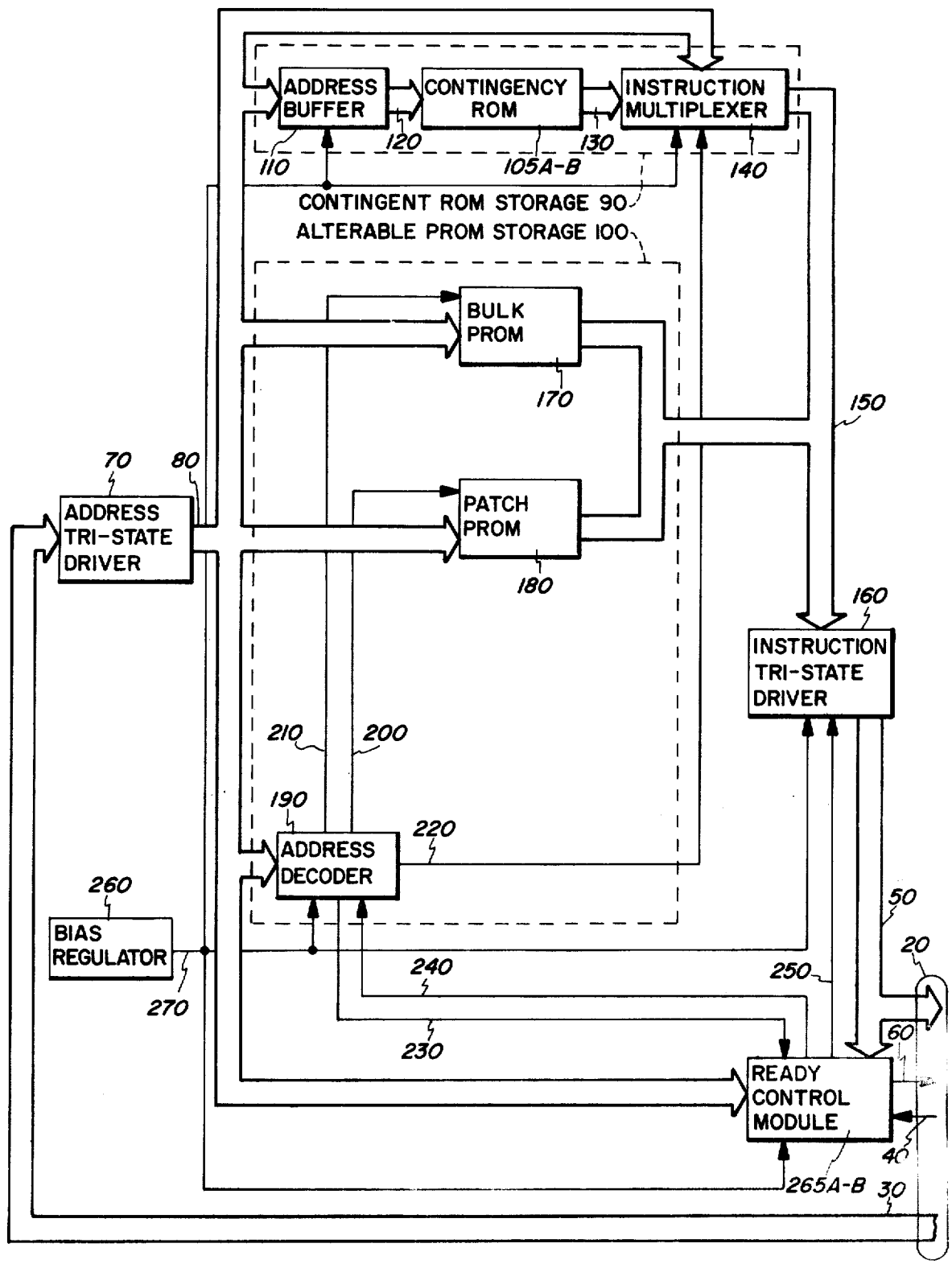
FIG. 1 is a block diagram of the auxiliary ROM memory system.

As indicated supra and as shown in FIG. 1, ARMS 10 is connected via the system bus 20 to the CPUM thereby allowing receipt by ARMS 10 of accessed addresses on main bus 30 and associated control signals on lines 40 from the CPUM, and similarly transmittal of accessed instructions on main bus 50 and associated control signals on lines 60 by ARMS 10 to the CPUM.

The accessing addresses outputed by the CPUM on the main address bus 30 of the CPUM are operative to proceed to the on-board ROM (not shown) of the CPUM, and also to all of the memory categories of the off-board ARMS (10). The accessing signals on the main address bus 30 after being conditioned by the Address Tri-state Driver 70 of the ARMS 10 proceed on subaddress bus 80 to the two major categories of memory in the ARMS 10 including contingent ROM storage 90 for memory requirements in excess of or in lieu of on-board ROM, and Alterable PROM storage 100 for implementation and/or installation of changes to on-board ROM. The singular minor category of memory in the contingent ROM storage 90 being the contingency ROM 105A-B which is operative to access subaddress bus 80 through the Address Buffer 110 via an inter address bus 120, and output instruction code on an inter instruction bus 130 to an instruction multiplexer 110. The instruction multiplexer 140, after also receiving signals on subaddress bus 80 indicating block memory selection, will output instruction code on subinstruction bus 150 to an Instruction Tri-state Driver 160 for conditioning.

The dual minor categories of memory in the Alterable PROM storage 100 are the bulk PROM 170 for code extensions or in-line code insertions and the Patch PROM 180 for single in-line bit pattern alterations each receiving access signals on the main address bus 80 from the Address Tri-state Driver 70. It will be appreciated that Bulk PROM, which may be used with Patch PROM 180, as will be seen infra, may be controlled to act as mutually exclusive PROM through logic branching for extensions and insertion, or alternatively to act as mutually inclusive PROM through single-level address decoding for large-scale code overlay. It will be further appreciated that Patch PROM 180, which may be used either with or without Bulk PROM 170, as will be seen infra, is controlled through multi-level address decoding for small-scale code overlay. An address decoder 190 is provided to receive the same accessed address on subaddress bus 80 from the Address Tri-state Driver 70 as does collectively the on-board ROM of the CPUM and the memory categories of the ARMS 10, for resolving conflicting memory requests through hierarchal subordination where the accessed address overlaps more than one address range of the enumerated categories of memories. The degree of subordination in the hierarchy of categories from a high to a low level is ordered as follows: Patch PROM 180, Bulk PROM 170, contingency ROM 105A-B, and on-board ROM. The control line groups outputed by the address decoder 190 to establish this hierarchal ordering are 200, 210, and 220 for Patch PROM 180, Bulk PROM 170, and contingency ROM 105A-B respectively. Since on-board ROM is entirely subordinated, it will only be priorized in the hierarchy by default.

After conditioning by the Instruction Tri-state Driver 160, instruction code signals are outputed onto the main instruction bus 50 of the system bus 20 for bifurcation first to the CPUM and also to a Ready Control Module 265A-B operative to synchronize the read-accesses of the ARMS 10 by the CPUM. Said synchronization of read-accessing is obtained through an input-/output interface to the address decoder 190 on line groups 230 and 240 respectively, an output interface on line 250 to the Instruction Tri-state Driver 160, and an input/output interface to the CPUM on the line groups 40 and 60, respectively, of the system bus 20.

To preclude noise transients and other environmental anomalies from being induced onto sensitive address and instruction bus lines, a Bias Regulator 260 has been interposed between the power supply system (not shown) and the ARMS 10 that its services thus providing reliable regulated energizing on line group 270 to the various client modules in the ARMS 10.

Figure 5:
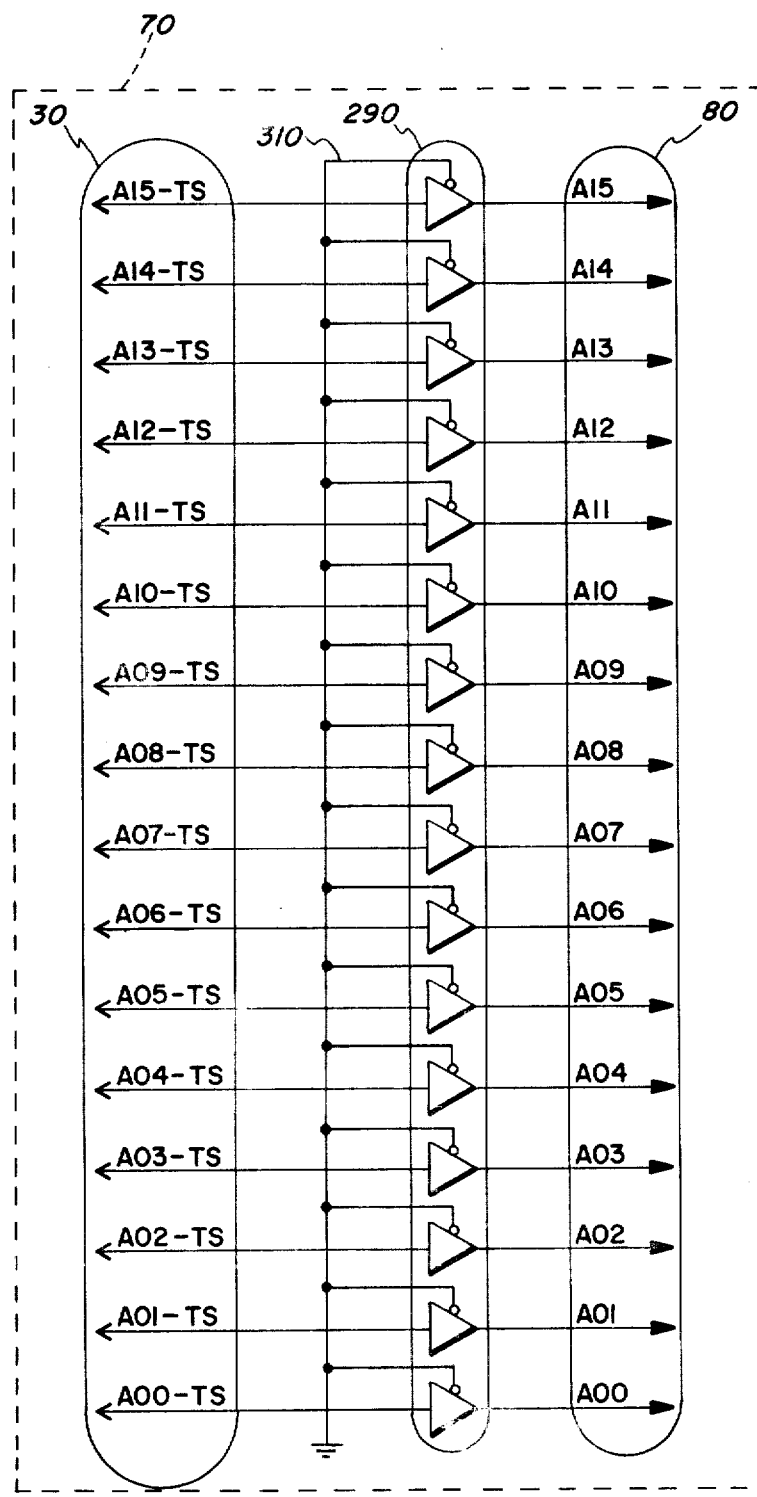
FIG. 5 is a schematic diagram of the tri-state address driver module of the auxiliary ROM memory system of FIG. 1.

In regards to the Address Tri-state Driver 70 of FIGS. 1 and 5, address signals designated A00-TS through A15-TS on the main address bus 30 of the system bus 20 are received by a group of tri-state drivers parallelly by a group of tri-state drivers 290 of the Address Tri-state Driver module 70 at their inputs. Insomuch as the grounded control line 310 of the tri-state driver group 290 is effectively continuously on, the tri-state driver group 290, accordingly, will continuously output on parallel line group 80 the address signals A00 through A15. The group of tri-state drivers 290 serve to condition the inputed address signals by acting as buffers or drivers having three state outputs which are used to drive the bus lines 80 directly. A particular embodiment of a hex bus tri-state driver as used for the address tri-state driver group 290 would be a Model 74 367.

Figure 6:
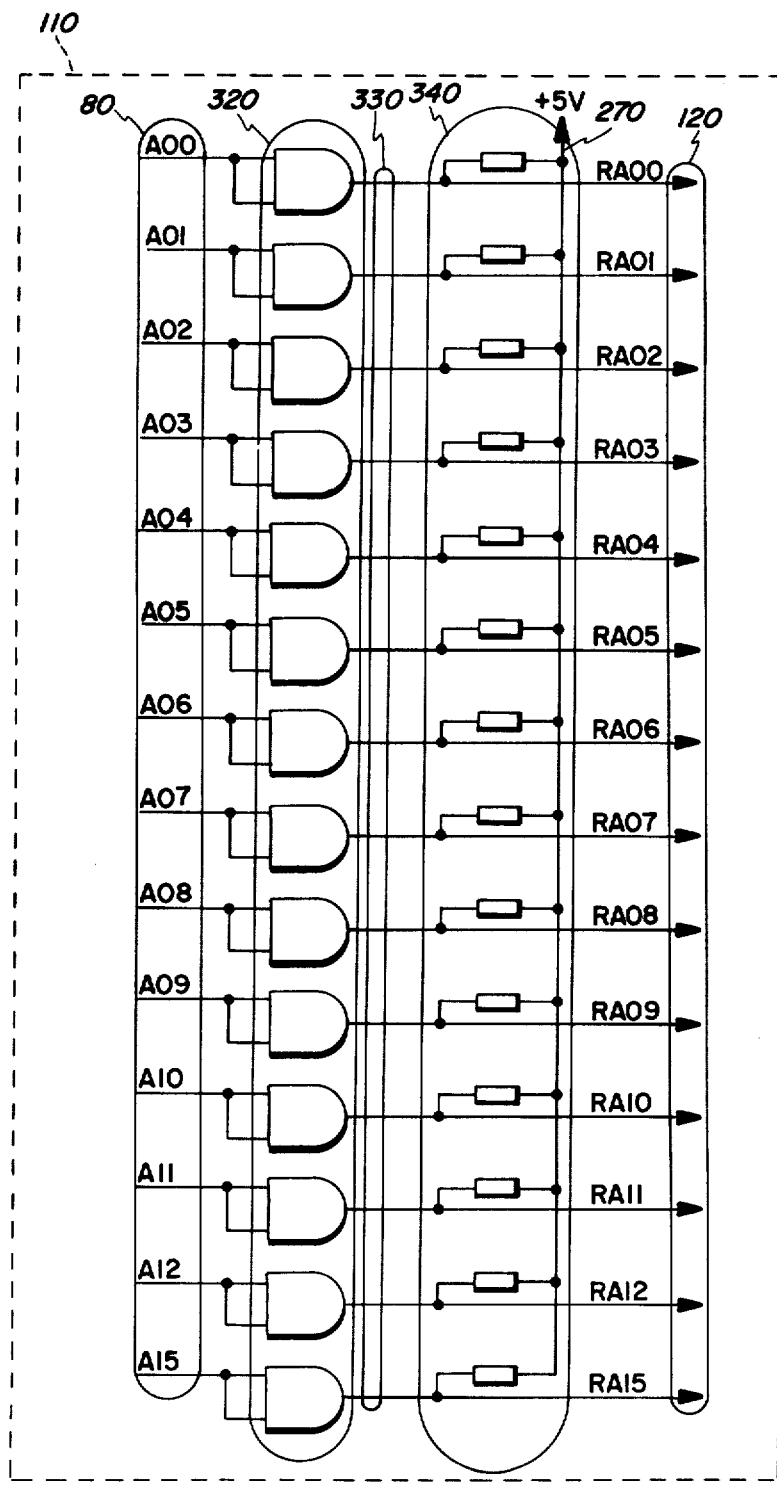
FIG. 6 is a schematic diagram of the address buffer module of the auxiliary ROM memory system of FIG. 1.

Driven address signals A00 through A15 flow out of the address tri-state driver 70 on the subaddress bus 80 to the address buffer 110 of FIGS. 1 and 6 where each of the address lines are inputed to a positive logic AND gate of a group 320 having two inputs commonly terminated. Each of the AND gates of the group 320 being a Model 7408 being used here to bufffer differing bias levels on the supra address lines. Buffered address signals from the AND gate group 320 are outputed on line group 330. Each of the output lines of the group 330 are terminated by its own biasing resistor of 680 ohms of the resistor group 340 where each of said resistors is tied at its opposing end to a +5 volts bias on a line 270 from the bias regulator 260. From there, the biased address signals RA00-RA15 are outputed on inter address bus 120 to the contingency ROM module 105A-B.

Figure 7A:
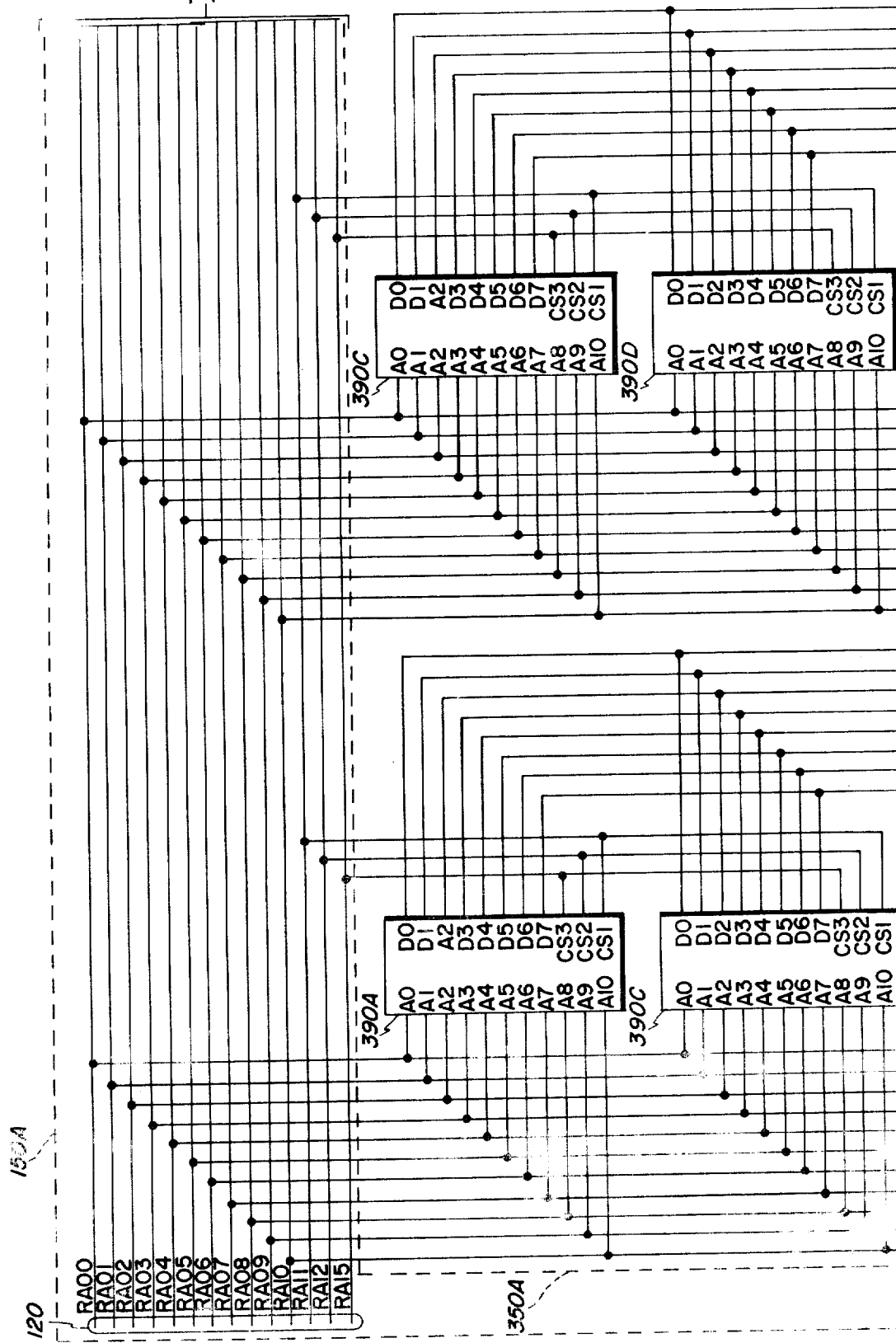
FIGS. 7AA, 7AB, 7AC, 7AD, 7BA, 7BB, 7BC and 7BD is a schematic diagram of the contingent ROM memory of the auxiliary ROM memory system of FIG. 1.

The contingency ROM 105A-B of FIGS. 1 and 7(AA-AD and BA-BD) are operative to receive the address signals RA00 through RA15 on inter address bus 120 in a parallel mode into four distinct blocks of memory. The four distinct blocks of memory being 350, 360, 370, 380 of subsystem blocks 105A and 105B respectively. The total memory capability of the contingency ROM 105A-B is 64KB where each of the subsystem blocks 105A and 105B each have 32KB, and each of the blocks of memory 350 through 380 therein each in turn have 16KB of memory. Each of the blocks 350 through 380 have eight ROM chips of 2KB each wherein the preferred embodiment (each ROM chip) is a 2048 × 8 model 8316A having 10 parallel address line inputs, three parallel chip select inputs, and eight data parallel outputs. Individual ROM chips for block 350 are designated 390A-H, for block 360 they are designated as 400A-H, for block 370 they are designated as 410A-H, and for block 380 they are designated as 420A-H. Address lines RA00-RA10 of interaddress bus 120 are used to parallelly address inputs A00 through A10 of each of the ROM chips of the contingency ROM 105A-B. Address lines RA11-RA13 of interaddress bus 120 are used to address chips select 1 through chip select 3 ($\overline{CS1}$-$\overline{CS3}$) in a parallel manner for each chip respectively. D0-D7 outputs of each of the chips indicates data or instruction 0 through instruction or data 7 lines in a parallel manner.

In regards to block 350 of submodule 105A having ROM chips 390A-H, the data or instruction output lines are designated here as RDA0-RDA7 of the first block address group 430 of interinstruction bus 130. In regards to block 360 of submodule 105A having ROM chips 400A-H, output terminals D0-D7, for each of the ROM chips, output parallel signals RDB0-RDB7 on second block address group 440 of interinstruction bus 130. In regards to block 370 of submodule 105B for ROM chips 410A-H, output terminals D0-D7 output parallelly as signals RDC0-RDC7 on their block address group 450 of interinstruction bus 130. In regards to block 380 of submodule 105B, ROM chips 420A-H, output terminals D0-D7 output parallelly as signals RDD0-RDD7 of fourth block address group 460 of inter instruction bus 130. It will be noted that for each of the ROM chip groups 350-380, either the top row only or the bottom row only, where top row is the A, C, E, and H row and the bottom row is B, D, F, H, may be accessed alternatively, as in a logical exclusive OR mode, at any one time as chip selected.

Figure 8:
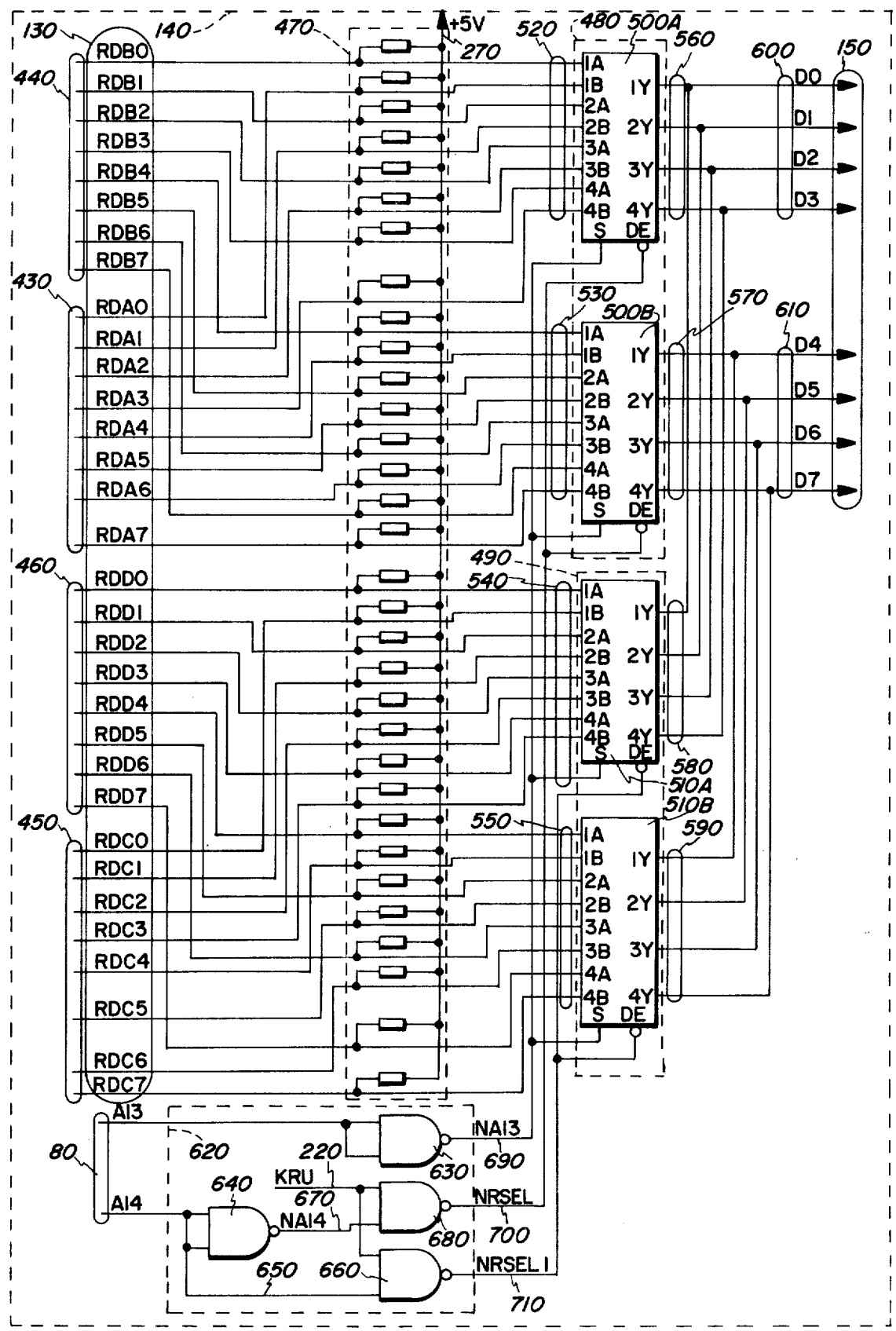
FIG. 8 is a schematic diagram of the contingency ROM Instruction multiplexer of the auxiliary ROM memory system of FIG. 1.

The instruction multiplexer 140 of FIGS. 1 and 8 is operative to receive instruction data signals on the interinstruction bus 130 from contigency ROM 105A-B. Particularly, each instruction data line on interinstruction bus 130 is biased by a 10K ohm resistor on each of the lines from a resistive group 470 including a plurality of resistors having each of their opposing ends connected to a plus 5-volt bias which is derived on line 270 from the bias regulator 260. The mux receiving groups 480 and 490 each have two multiplexer components including 500A and B for the first multiplexer group 480, and 510A and B for the second multiplexer group 490.

Each of the multiplexer components 500A-B and 510A-B include schottky-clamped high performance multiplexers, Model 74S257, the multiplexer 500A-B and 510A-B feature three state outputs which can interface directly with and drive data lines of bus organized systems. In addition, with all but one of the common outputs disabled (at a high impedance state) the low input of the single enabled output will drive the bus line to a high or low logic level. The three state output feature means that N bit (parallel) data selectors with up to 20 sources can be permitted for data buses. It also uses standard TTL registers for a data retention throughout the system. To minimize the possibility that two outputs would attempt to take a common bus to opposite logic levels, the output enable circuitry is designed such that the output and disenable time are shorter than the output enable times. Each of the multiplexers 500A-B and 510A-B features quadruple two-line-to-one-line data selector multiplexers through three state outputs. Accordingly, there are four inputs for the A inputs, and four inputs for the B inputs which may be alternatively used. The OE output, meaning output enable, allows the multiplexer to be in an "on" state whereby it may be switched from either the A or B input. The SR selector input terminal acts to switch the inputs of an enabled multiplexer to either an A or B state. The output terminals 1Y, 2Y, 3Y, and 4Y are the result of either switching to either an A or a B input for an enabled output or an enabled multiplexer 500A-B and 510A-B. The function table for each of the multiplexer components is as shown below.

| FUNCTION TABLE | | | | |
|---|---|---|---|---|
| Inputs | | | | |
| Output Control | Select | A | B | Output Y |
| H | X | X | X | Z |
| L | L | L | X | L |
| L | L | H | X | H |

-continued
FUNCTION TABLE

| Inputs | | | | |
|---|---|---|---|---|
| Output Control | Select | A | B | Output Y |
| L | H | X | L | L |
| L | H | X | H | H |

Instruction/data signals are designated as DA0-RDA7 on first block address group 430 from ROM block 350, and instruction signals designated as RDB0-RDB7 on second block address group 440 from ROM blocks 360, where both groups form part of interinstruction bus 130, are presented to the first multiplexer group 480 after biasing by group 470. Each resistive element of 470 is 10K and is biased at its opposite end by +5 volts on line 270 from regulator 260. Particularly, instruction signals RDA0-RDA3 and RDB0-RDB3 are presented as a line group 520 for A and B inputs, respectively, of multiplexer component 500A which is a model 74S257. Instruction data signals RDB4-RDB7 and instruction data signals RDA4-RDA7 are inputed as a group 530 to the A and B inputs, respectively, of multiplexer component 500B which is also a Model 7S257. Instruction data lines RDD0-RDD3 and RDDC0-RDC3 are inputed after being biased by resistance 470 as a group 540 to the A and B input, respectively, of multiplexer component 510A which also is a Model 74S257. Instruction data signals RDC4-RDC7 and instruction data signals RDD4-RDD7 are inputed after being biased by resistance 470 as a group 550 to A and B alternate inputs, respectively, of multiplexer component 510B which is also a Model 74S257. After either a first or second multiplexer group 480 or 490, respectively, is enabled and after either the A or B input alternatively is selected for the multiplexer components within the enabled group, then either output line group 560 and 570 or 480 and 590, respectively, is terminated to output as group 600 for D0-D3 and 610 for D4-D7 on subinstruction bus 150 to instruction tri-state driver 160.

The gating logic for the select and output enable inputs designated as 620 is operative to receive address signals on subaddress bus 80, mainly A13 and A14, for inputing to AND gate 630 and 640 having inputs commonly tied respectively. A14 is also operative to be sent on line 650 to a NAND gate 660. The output of NAND gate 640 proceeds on lines 670 to NAND gate 680. A control signal designated as KRU on line 220 is operative to bifurcatably input to already mentioned NAND gates 680 and 660. When the signal as outputed by NAND gate 630 is high on line 690 as inputed to the select S inputs of multiplexers 500A-B and 510A-B, the A inputs will be selected for outputing. Correspondingly, when the output from NAND gate 630 on line 690 designated as NA13 is low, the B input as selected will be outputed on the multiplexers mentioned. Whenever a KRU signal on line 220 is present at NAND gates 680 and 660, they will operate in a mutually exclusive manner depending on whether the A14 signal on the subaddress bus 80 is present or not present thereby causing NAND gate 680 to output or NAND gate 660 to output respectively. When NAND gate 680 outputs on line 700 as a signal NRSCL0, the multiplexer group 500A-B will be output enabled for selection. Likewise, when NAND gate 660 outputs on line 710 as signal NRSCL1, multiplexer group 490 will be output enabled for selection.

Figure 9:
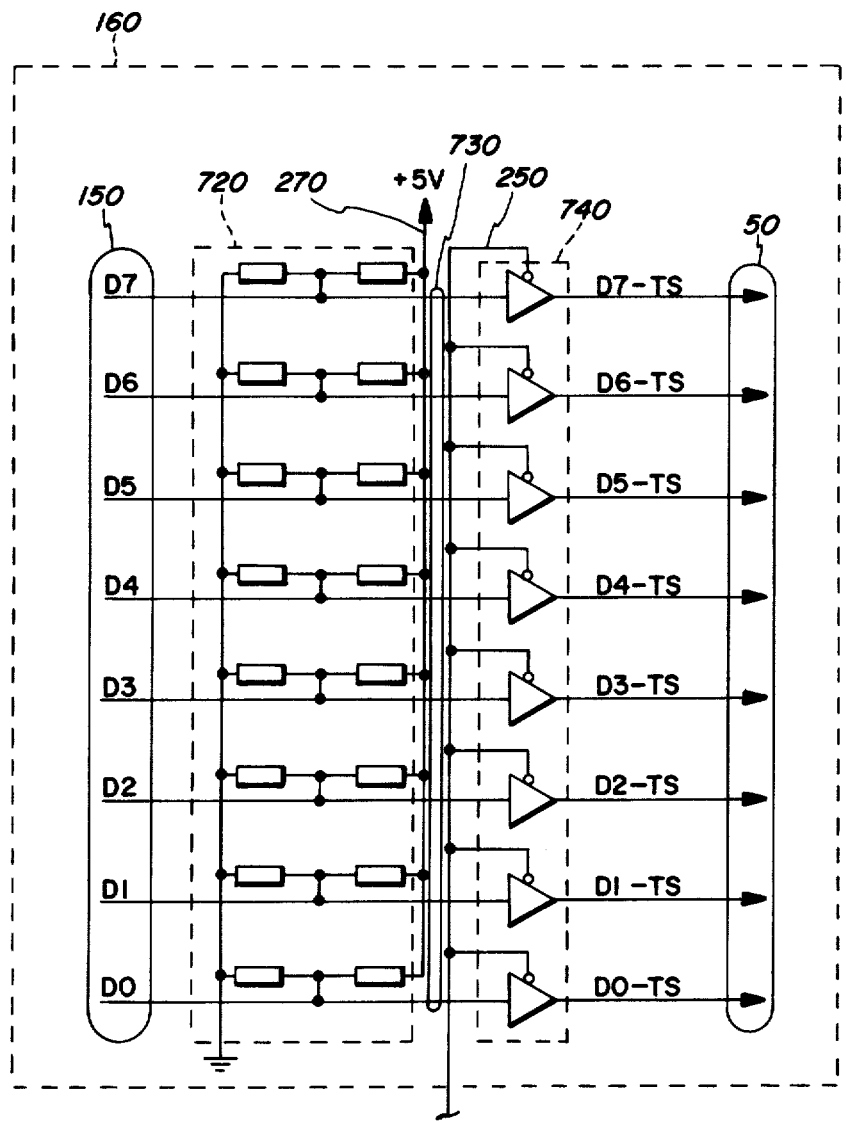
FIG. 9 is a schematic diagram of the instruction tristate driver of the auxiliary ROM memory system of FIG. 1.

Instruction data signals D0-D7 are received by the instruction tri-state driver 160 of FIGS. 1 and 9 on subinstruction bus 150. The signals on the instruction data lines of subinstruction bus 150 are fed to a biasing resistance network 720 having each of the lines commonly terminated with a 492 Ω resistor and a 2.5K Ω resistor where said resistors are grounded and biased respectively. The biased resistor of 492 ohms is terminated at its biasing end by a plus 5 volts on line 270 from the bias regulator 260. After being biased, instruction data signals on line group 730 proceed to a tri-state driver for each of said lines where the group is designated as 740. The preferred embodiment of the tri-state driver is a Model No. 74367 hex bus driver (3 state). The control line for each of the tri-state drivers 250 designated as a NDBEN signal from the ready control module 265A-B is operative to be on whenever a read function is being performed on any of the memory categories of the ARMS 10. Accordingly, output signals from the tri-state driver group 740 proceed on main instruction bus 50 of the system bus 20 bifurcatably to the CPUM and also to the ready control module 265A-B.

Figure 2:
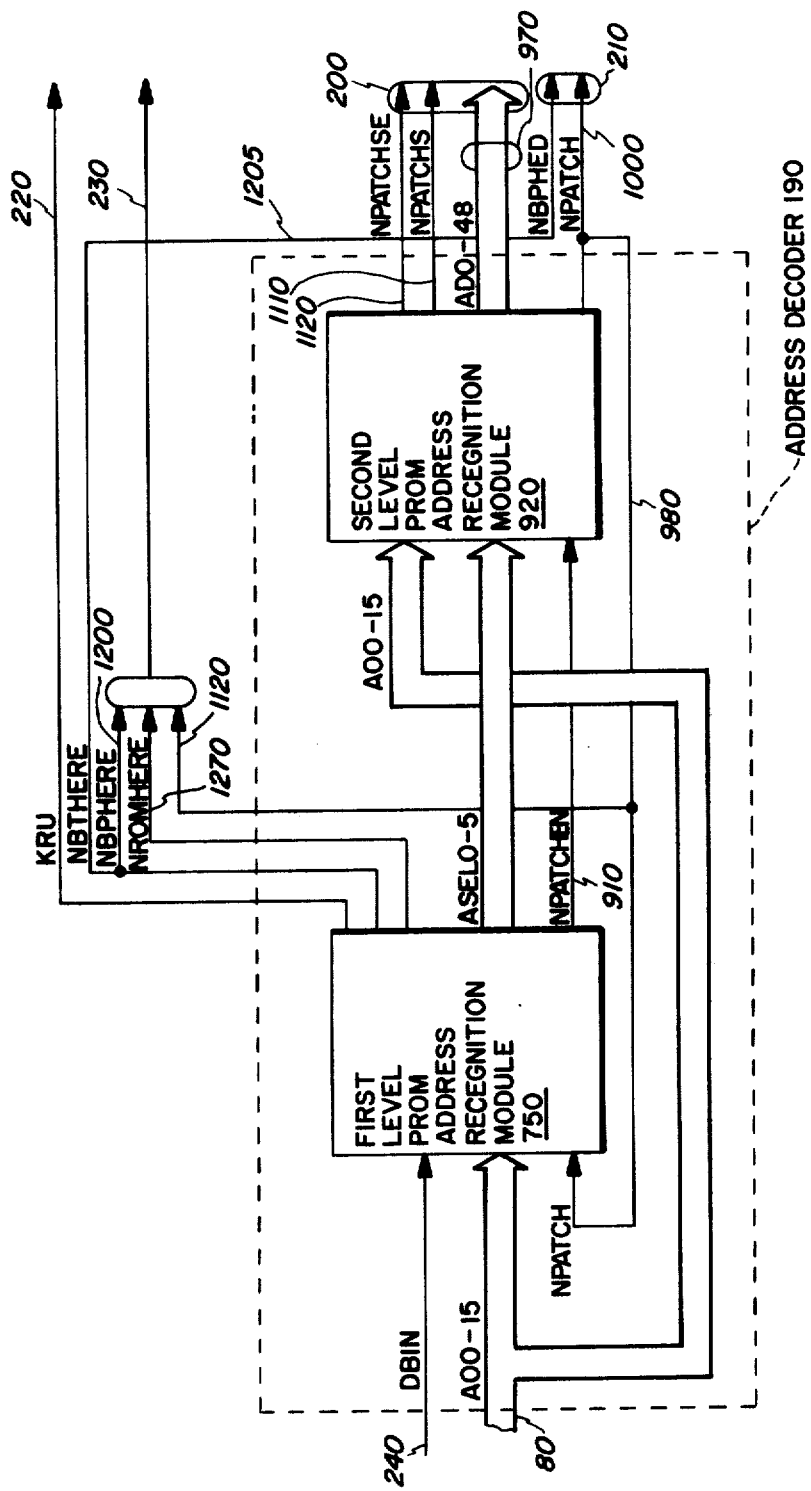
FIG. 2 is a block diagram of the decoder control module of the auxiliary ROM emmory system of FIG. 1.

Address lines A07-A15 on subaddress bus 80 are received by the first level PROM address recognition module of the address decoder 190 of FIGS. 1, 2 and 3. Particularly, the address lines A7-A15 are inputed to the input terminals A0-A8 each of a pair of first level address recognition PROMs 760 and 770 respectively. Output signals from terminals 01 through 04 for the first level address recognition PROM 760 and 770 are provided on line groups 780 and 790 respectively. Chip enable (CE) for first level address recognition PROM 760 is received on line 800 and contains the signal from an inverter 810 which is inputed to by a bias line 820 from bias network 830 being the same as one of the elements of bias network 720 described supra. Chip enable (CE) for first level PROM address recognition PROM 770 is received on line 840 as ground. It will be noted that both chip enables 40 for the first level address recognition PROMS 760 and 770 are enabled on continuously.

Each of the parallel lines of the line groups 780 and 790 are individually biased by biasing network having elements identical to those in biasing network 720 or the present biasing network is designated as 850. A subset of the collective lines of the line group 780 and 790 herein designated as line group 860 is derived from outputs 01 through 04 of PROM 770 and outputs 01 and 02 of PROM 760 wherein the signals of the line group 860 are designated as ASEL0-ASEL5 respectively. Signals ASEL0-ASEL5 of line group 860 bifurcate to receive by input terminals A3-A8 of both second level PROM address recognition PROMS 870 and 880. Chip enable (CE) is provided on line 890 from inverter 900 which, in turn, receives a bias signal on line 910 from one element of the resistive network 850 described supra. It will be noted that the second level address recognition PROMS 870 and 880 are part of the second level PROM address recognition module 920. The bias being continuous will be operative to continuously operate the PROMS 870 and 880 in a continuous chip enable state. The enabled second level address recognition PROM 870 and 880 will output on terminals 01-04 on line groups 930 and 940 respectively. Line group 930 is then biased by a resistive group 950 having elements identical to those in resistive group 850. Line group 940 is similarly biased by a resistive group 960 identical to resistor group 950 described supra. After being biased, a subset of line group 930 designated as signals AD0-P-AD2-P, and a subset of line group 940 designated as signals AD3-P-AD4-P are consolidated as line group 970. This signal outputed from the 01 terminal of the PROM 870 as part of the line group 930 which is designated as the NPATCH signal on line 980 is operative to bifurcate onto lines 990 and 1000. Line 990 going into a patch select logic module 1010. Line 1000 is operative to, in turn, bifurcate to lines 1020 and 1030 to be part of line groups 230 and 200 respectively.

Figure 3A:
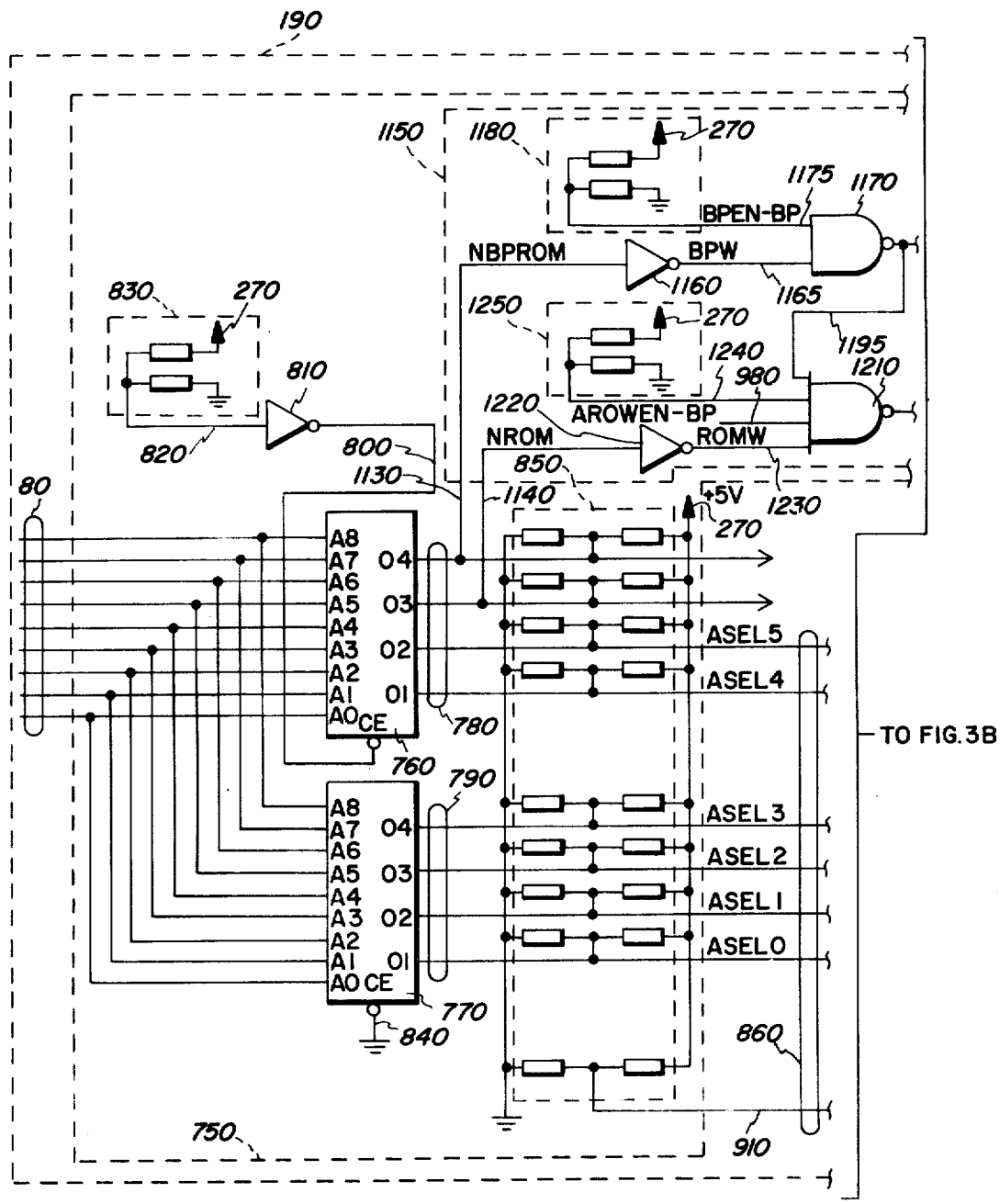
FIGS. 3A and 3B is a schematic diagram of the decoder control module of FIG. 2.
Figure 3B:
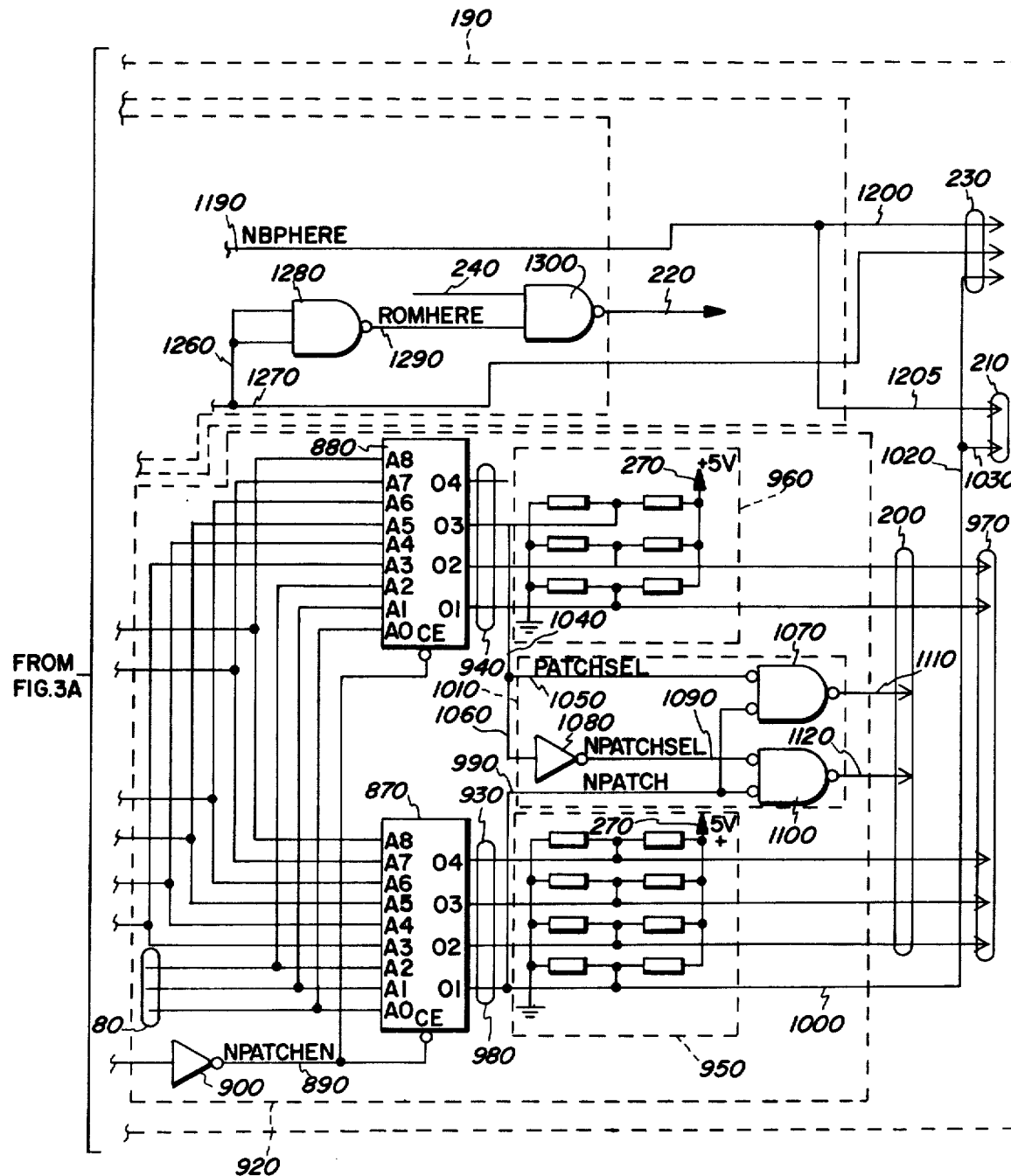

Output terminal 03 of PROM 880 is operative to output as part of line group 940 on line 1040 as a signal designated as PATCHSEL to the patch select logic module 1010 also. Line 1040 is operative to, in turn, bifurcate as lines 1050 and 1060 to a NAND gate 1070 and an inverter 1080 respectively. Inverter 1080 is operative to output on line 1090 as a signal designated as NPATCHSEL to be received by NAND gate 1100. Line 990 mentioned supra is operative to bifurcate as inputs to supra mentioned NAND gates 1070 and 1100. It will be noted that NAND gates 1070 and 1100 additionally have inverted logical inputs. Upon concurrent receipt of inputs to either NAND gate 1070 or NAND gate 1100 they will alternatively output on either line 1110 or 1120 to be part of line group 210 mentioned supra. It will be appreciated that the NPATCH signal on line 990 acts as the control input to NAND gates 1070 and 1100 whereby they will either receive a PATCHSEL or a NPATCHSEL signal on either line 1050 or 1090 alternatively but not concurrently in regards to the logic thereof. PROM 760 of FIGS. 3A-B is operative from output terminals $0^3$ and $0^4$ as part of line group 780 to output, on lines 1130 and 1140, signals NBPROM and NROM designated thereas respectively to a gating control module 1150. The NBPROM signal on line 1130 is operative to proceed to inverter 1160 which, in turn, outputs as signal BPH on line 1165 to NAND gate 1170. NAND gate 1170 is also operative to receive an input on line 1175 from biasing network signal BPEN-BP from biasing network 1180 which is identical to a single element in resistive network NA50 described supra. NAND gate 1170 will output bifurcatably as signal NBPHERE on line 1170 and line 1195; line 1190, in turn, bifurcating to line 1200 as part of line group 230 and line 1205 as part of line group 200 both mentioned supra. Line 1195 is operative to input to a NAND gate 1210.

NROM signal on line 1140 mentioned supra is operative to be received by inverter 1220 which will in turn output on line 1230 as signal ROMH to supra NAND gate 1210. NAND gate 1210 is also operative to receive an NPATCH signal on line 980 from PROM 870 mentioned supra. NAND gate 1210 is further operative to receive an input on line 1240 as a signal AROMEN-BP from resistive network 1250 which is identical to resistive network 1180 described supra. Line 1210, in turn, is operative to bifurcatably first to line 1260 and then to line 1270. Line 1260 bifurcatably to the dual inputs of NAND gate 1280 where said inputs are commonly tied. NAND gate 1280 being operative acts as a driver that logically inverts signals inputed the reto. NAND gate 1280 will output on line 1290 the signal ROMHERE to an AND gate 1300; AND gate 1300 also being operative to receive signal DBIN on line 240 from the ready control module 265A-B. Upon concurrent signals by AND gate 1300, it will output on line 220 as signal KRU to the PATCH PROM 180 of alterable PROM storage 100 for control thereof. It will be noted that each of the PROMS 760, 770, 880, and 870 are Model No. 3602's PROM having the capacity of 512×4 bits.

The Alterable PROM memory 100 of FIGS. 1 and 4A-B is operative to receive control line group 200 from the Address Decoder 190 including an NPATCH signal on line 1030, and BPHERE signal on line 1200 and AD0-P-AD4-P signals on line group 970. The Alterable PROM memory 100 is also operative to receive subaddress bus 80 including signals A00-A10. In addition, control line signals 210 from the Address Decider 190 are also received as signal NPATCH SELA on line 1120 and NPATCH SELB on line 1110. A demultiplexer 1310 in the bulk PROM 170 of Alterable PROM memory 100 is operative to receive the NPATCH signal on 1030 at its 1C input, and an open circuit at 2C input. Address lines A9 and A10 as a subset of subaddress bus 80 are received by the demultiplexer 1310 at its A and B input terminals, respectively, in the Bulk PROM 170. In addition, NBPHERE signal on line 1200 is received at the 1G input terminal of the demultiplexer 1310, and the 2G input terminal thereof being open circuited. The output terminals for demultiplexer 1310 include 1y0, 1y1, 1y2, and 1y3 for signals NPSEL0, and BPSEL1, and BPSEL2 and NBPSEL3, respectively, are part of line group 1320.

The Bulk PROM module 100 consists of PROM chips 1330A-H, the preferred model being a Model 3602 having 512 × 4-bit capacity. Each of the ROMS 1330A-H have address input terminals A0-A8, a chip enable (CE) input terminal, and four parallel output terminals including $\phi 1$-$\phi 4$. Subset address bus 80 has address signals A00-A08 that are parallelly inputed to each of the address inputs of the PROMS including input terminals A0-A8 respectively. Output line group 1320 from demultiplexer 1310 is used to selectively chip-enable the PROM chips 1330A-H. Particularly, signal NBPSEL0 of line group 1320 is used to chip-enable on line 1340A the PROMS 1330A and 1330E. Signal NBPSEL1 on line group 1320 is used to chip-enable on line 1340B the PROMS 1330B and F. Signal NPPSEL2 on line group 1320 is used to chip-enable on line 1340C the PROMS 1330C and G. Signal NBPSEL3 on line group 1320 is used to chip-enable on line 1340D the PROMS 1330D and H. It will be noted that only one of the PROMS 1330A, B, C, and D may be chip-enabled any one given time, and likewise only one of the PROMS 1330E, F, G, and H will be operative to be enabled any one given time for instruction data signals D0-Dc and D3, and D4-D7 on line groups 1350A and 1350B, respectively, of sub-instruction bus 150.

Signals AD0-P-AD4-P of line group 970 of control group 200 are operative to be received by the patch PROM module 180 of the Alterable PROM memory 100 for addressing thereof. In addition, NPATCH SELA and NPATCH SELB signals on lines 1120 and 100, respectively, of control line group 210 are also operative to be received as control signals by the patch PROM module 180. Specifically, signals AD0-P-AD4-P of line group 970 are operative to be received by the input terminals A4-A8 of each of the PROM chips 1360A-D. Address lines A00-A03 of subaddress bus 80 are operative to be received parallelly by input terminals A0-A3 of each of the PROM chips 1360A-D. The NPATCH SELA signal of line 1120 is operative to be received by the chip-enable (CE) input of PROM chips 1360A and C. The NPATCH SELB signal on line 1110 is operative to be received at the input chip-enable terminals of PROM chips 1360B and D. It will be noted that during any "on" time, either PROM chip set 1360A and C or PROM chip set 1360B and D may be chip-enabled at any one given time but not both concurrently. PROM chips 1360A-D also are a Model 3602 having 512 × 4-bit capacity. Output terminals for PROM chips 1360A-D include output terminals $\phi1-\phi4$ in parallel. In particular, instruction data signals D0-D3 on line groups 1350A are outputed from PROM chips 1360A and B, and instruction data signals D4-D7 on line group 1350B are outputed from PROM chips 1360C and D where subset line groups 1350A and B comprise subinstruction bus 150. It will be noted that bulk PROM 170 and patch PROM 180 both being in Alterable PROM memory 100 have commonly terminated parallel output lines for instruction data signals D0-D7 as outputed on the subinstruction bus 150 that will proceed to instruction tri-state driver 160.

Figure 12A:
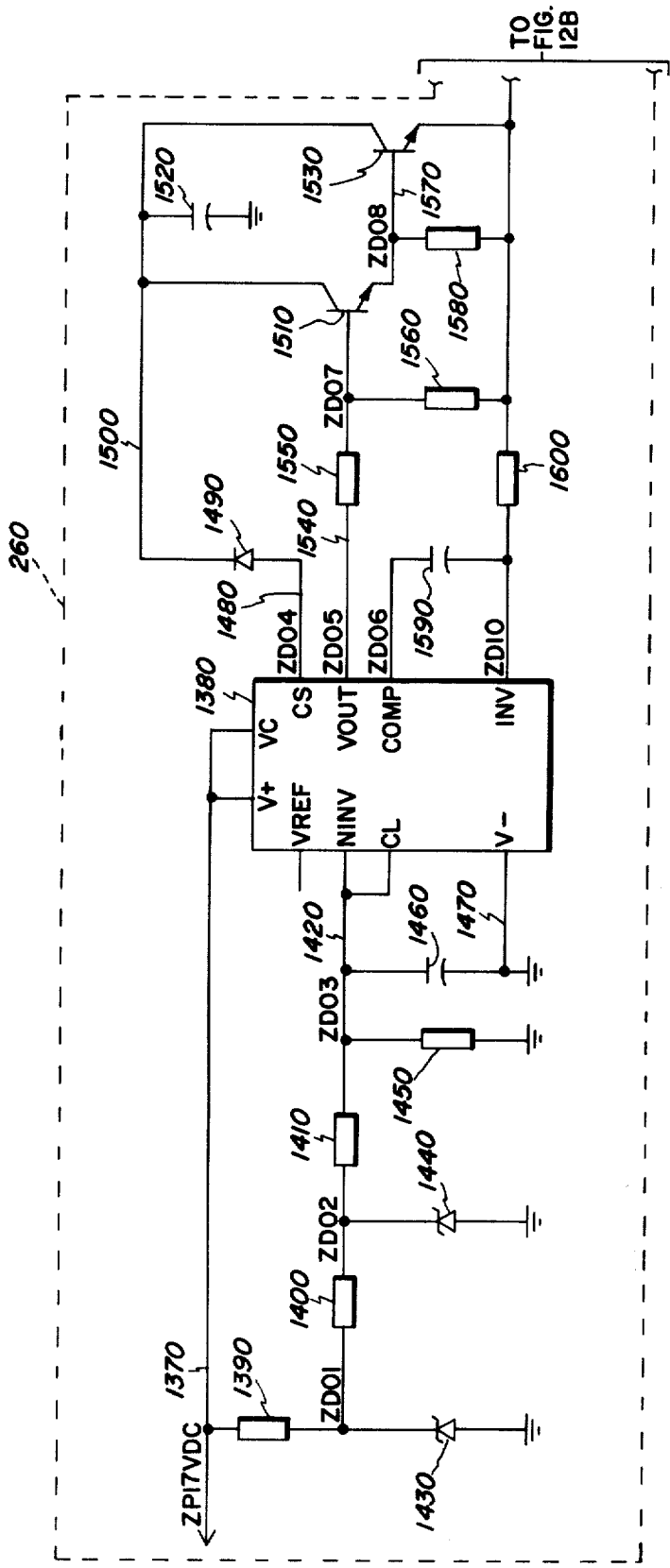
FIGS. 12A and 12B is a schematic diagram of the voltage regulator module of the auxiliary ROM memory system of FIG. 1.
Figure 12B:
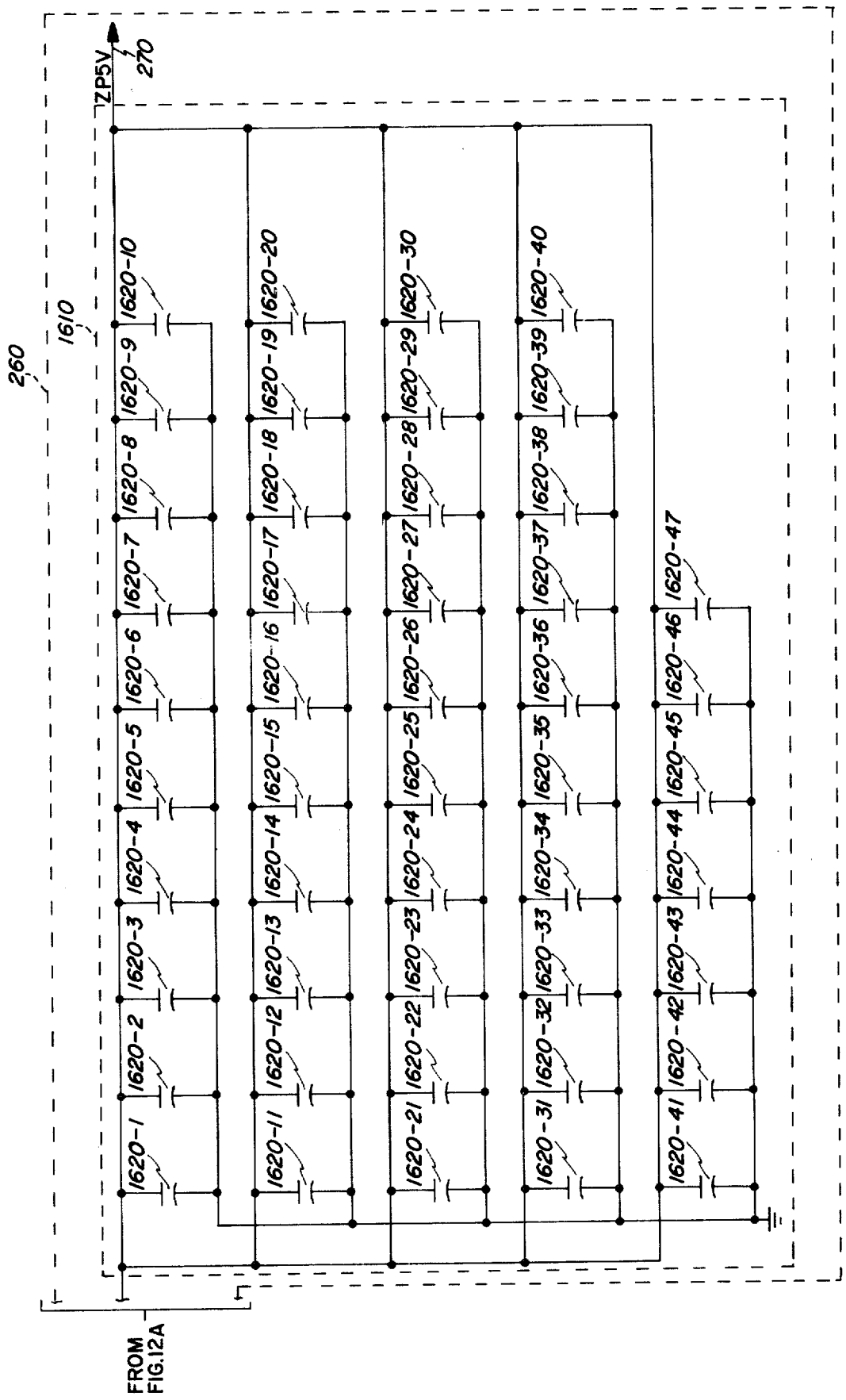

The bias regulator 260 as shown in FIG. 1 and FIGS. 12A-B receives a 17-volt d.c. unregulated voltage from a power source not shown on line 1370. The unregulated 17-volt d.c. on line 1370 is inputed bifurcatively to the V+ and VC input terminals of a Model 723C voltage regulator as inputs thereto. The V ReF input terminal of the voltage regulator 1380 is open circuited. A dropping resistance of 562 ohms is provided by resistor 1390 off of line 1370 which is in series with a second dropping resistor 1400 of 53 ohms and a third dropping resistor of 807 ohms designated as 1410 which inputs a signal designated as ZD03 bifurcatively to the QINV input terminal and a CL input terminal of the voltage regulator 1380. Interposed between resistors 1390 and 1400 is a limiting diode 1430 which is grounded at its opposite end and is designated as 1430. Interposed between resistor 1400 and 1410 is a limiting diode 1440 grounded at its opposite end and designated as 1440.

A RC circuit for eliminating transients consisting of grounded resistor 1450 of 2.9k ohms and a parallel grounded capacitor 1460 of 0.0015mf both being interposed between resistor 1410 and the QINV/CL terminal input of voltage regulator 1380. At the grounded end of capacitor 1460, there is interposed a line 1470 to the input terminal V— of voltage regulator 1380. Through the CS output of voltage regulator 1380 is a signal ZD04 on line 1480 through diode 1490 and outputed on line 1500 to the collector of a transistor 1510. Line 1500 is also grounded through capacitor 1520 for limiting transients. Line 1500 additionally is connected to the collector of a second transistor 1530. The OUT output terminal of the voltage regulator 1380 outputs on line 1540 a signal designated as ZD05 to a resistor 1550 of 100 ohms dropping resistor of 100 ohms which, in turn, outputs bifurcatively to the base of transistor 1510 and to a dropping resistor 1560 of 1K ohms. Transistor 1510 through its emitter outputs on line 1570 bifurcatively to the base of transistor 1530 and to a dropping resistor of 75 ohms designated as 1580. A CLAMP terminal and a INV terminal of voltage regulator 1380 are commonly connected through a capacitor 1590 having 0.047mf. The INV terminal of voltage regulator 1380 is additionally connected as is the capacitor 1590 at one end to a dropping resistor 1600 having 680 ohms. The dropping resistor at its opposite end is connected to the dropping resistor 1560, the dropping resistor 1580, and the emitter of transistor 1530 and to the output line 270 designated as ZP5V for regulated voltage 5 volts d.c. The output line 270 is additionally connected through a capacitor module 1610 having capacitor 1620-1 through 47 where capacitor 1620-1 and 2 and 47 have a value of 3.3mf and remainder of the capacitors in the capacitor group 1610 having a value of 0.01mf. Capacitor group 1610 acts to take out all variations through power storage thereby smoothing out power demands on line 270 for a more perfectly regulated d.c. voltage of +5 volts to the client modules in ARMS 10.

Figure 10:
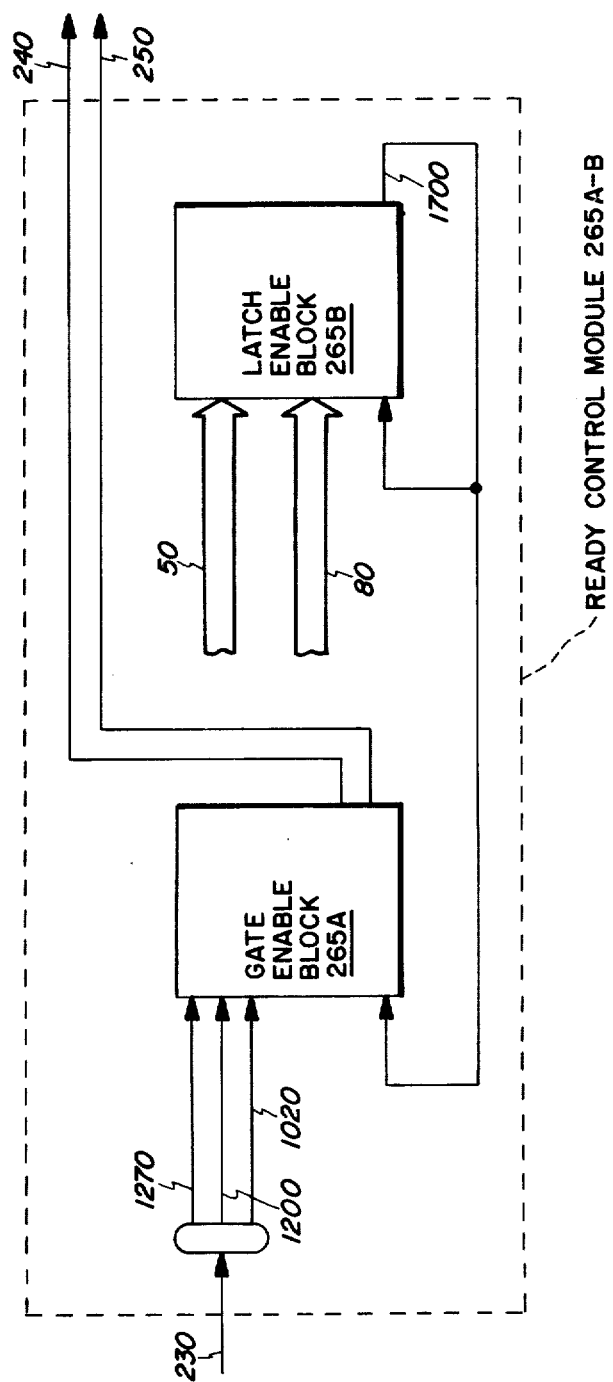
FIG. 10 is a block diagram of the ready control module of the auxiliary ROM memory system of FIG. 1.

In regards to the ready control module 265A as shown in FIGS. 1, 10 and 11B, line group 230, including the signals NROMHERE, NBPHERE, and NPATCH on lines 1270, 1200, and 1020, respectively, are inputed to an OR gate having inverted inputs, the OR gate being designated as 1630. OR gate 1630 is operable to output on line 1640 to NAND gate 1650. A NDBIN-TS signal on line 1660 from the CPUM (not shown) is inputed to an inverter 1670 for a logical inversion as outputed on signal DBIN line 240 to the address decoder 190.

The NDBIN-TS signal on 1660 is a means of indicating by the CPUM to the ARMS 10 that the data or instruction bus 50 of system bus 20 is an input mode thereby enabling beginning of data or instructions on the data bus from the memory categories of ARMS 10. It will be noted that inverter 1670 also bifurcates to line 1680 as input to NAND gate 1650. It will also be noted that the NDBIN-TS signal is further described in the supra-referenced application. A PN signal indicating power normal on line 1690 is also inputed to NAND gate 1650 as received from the IOPM. It will also be noted here that the PN signal is also further described in the supra-referenced application. A PROGENARPM signal on line 1700 is received from the 265B portion of the ready control module for inputing to NAND gate 250. A MMEMREAD-TS signal on line 1710 to inverter 1720 is received from the CPUM and is also further described in the supra-referenced application. The signal is then outputed MEMR bifurcatively on lines 1730 and 1740 to NAND gate 1650 and inverter 1750, respectively. Inverter 1760 is then operative to output as signal NMEMR on line 1760 to an OR gate 2132.

The MEMW signal on line 2060 is received by inverter 2127 for outputing a logical negation thereof designated as signal NMEMW on line 2128 to jumper terminal set X9 2129. The jumper terminal set X9 2129 being used for responding to a write operation if so desired as explained in detail infra. The set X9 2129, once jumped, is allowed to flow onto line 2131 as signal NMEMW-1 to OR gate 2132. Line 2131 is biased by a resistive network 2133 identical to supra network 1890. OR gate 2132 has inverted inputs and will output as signal MEMR+W on line 2134 upon alternative receipt of signals on lines 1760 or 2131. Line 2134 from OR gate 2132 is operative to be outputed to supra NAND gate 1770. It will be noted that the MMEMREAD-TS signal indicates that the data bus 50 of system bus 20 will be used for memory read data as indicated in the status bits. A NREADYEN-TS signal on line 1780 is received by inverter 1790 from CPUM. The NREADYEN-TS signal is used to indicate that the CPUM knows that it has a valid memory or input data available on its data bus 50 at system bus 20. This aforementioned signal is used to synchronize the CPU with slower memory or I/O devices.

If after sending an address out from the CPUM it does not receive a ready input, the CPUM will enter a "wait" state for as long as the ready line is low. Signal from inverter 1790 proceeds as signal READYEN on line 1800 to NAND gate 1770. A PAGENABLE signal on line 1810 as inputed to inverter 1820 is received from CPUM. The PAGENABLE signal is further described in the supra-referenced application. A MEWEN-CP signal on line 1830 is received by an inverter 1840 from the CPUM. The MEMEN-CP signal is also further defined in the supra-referenced application. Inverter 1840 outputs on line 1850 where it is commonly tied from output line 1860 of inverter 1820 to proceed commonly as line 1870 to NAND gate 1880. It will be noted that a resistive network 1890 biases line 1850 where said resistive network is identical to supra-described resistive network 1250. It will be appreciated that MEMW signal on line 1640 also inputs to NAND gate 1770 and 1880. It will further be appreciated that signal PN on line 1690 also inputs to NAND gate 1770. The PROGENARPM signal on line 1700 also inputs to NAND gate 1770 and NAND gate 1880. In addition, PAGENABLE signal on line 1810 also is operative to input to NAND gates 1770 and NAND gate 1650. NAND gate 1650 upon concurrent receipt of inputs will output on line 250 as signal NDBEN to the instruction tri-state driver 160. NAND gate 1770, upon concurrent receipt, will output as signal NRDYEN on line 1900 to tri-state driver 1910 having inverted inputs and outputs where said input 1920 is grounded and output signal therefrom designated as NREADY-TS on line 1930 will be sent back to CPUM as described in supra-referenced application. NAND gate 1880 upon concurrent receipt of signals will output as signal NMENKILL on line 1940 where it will trifurcate to lines 1950, 1960 and 1970 to drivers 1980, 1990 and 2000 for outputing. Driver 1980 will output a signal ROMEN-BP on line 2010. Driver 1990 will output a signal RAMEN-BP on line 2020 to the CPUM as also described further in referenced supra application. The driver 2000 will output a signal MENEN-BP on line 2030 to the CPUM as also described further in supra-referenced application.

Figure 11A:
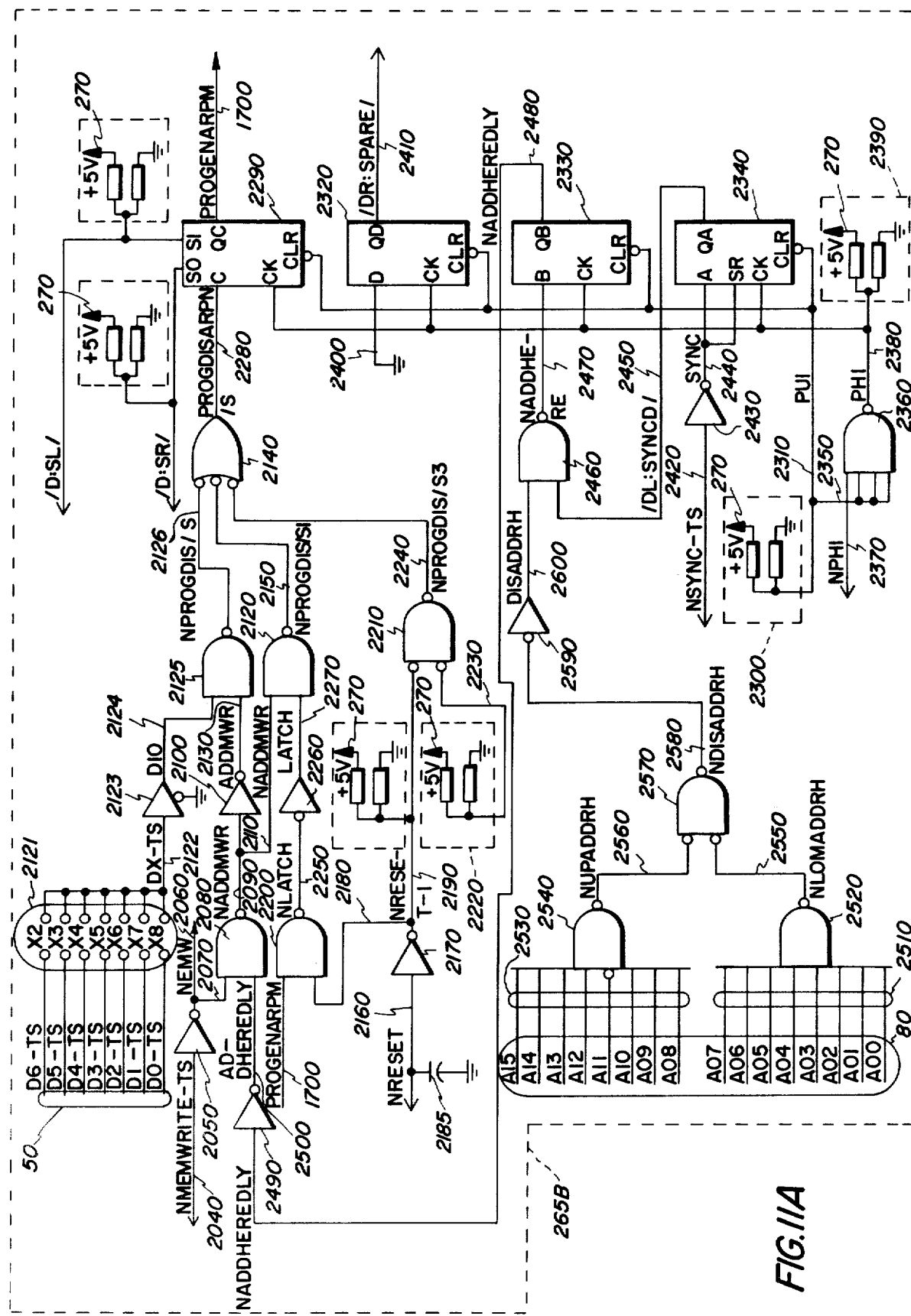
FIGS. 11(A-B) is a schematic diagram of the ready control module of the auxiliary ROM memory system of FIG. 1.

In regards to module 265B of ready control, as shown in FIGS. 1, 10, and 11a, a NMEM or MEMWRITE-TS signal on line 2040 as received from CPUM, and as further described in referenced supra application, is inputed to inverter 2050. Inverter 2050 bifurcatively outputs on lines 2060 and 2070 to the CPUM and to a NAND gate 2080. Line 2060 whose signal is designated as MEMW is further described in the supra-referenced application. NAND gate 2080 upon concurrent receipt of inputs will output as signal NADDMWR on line 2090 to inverter 2100. Line 2090 also bifurcates off onto line 2110 to NAND gate 2120. Inverter 2100 outputs on line 2130 as signal ADDMWR to NAND gate 2125.

The main instruction bus 50 from the Instruction Tri-state Driver 160 including instruction or data signals designated as D0-TS-D6-TS is received by jumper terminal set 2121 at points X2-X8; the jumper terminal set 2121 being used for data byte selection during a diagnostic isolation test as explained in detail infra. The set 2121, once jumpered, is commonly terminated at its output and on line 2122 as signal DX-TS which is received by grounded tri-state driver 2123. The grounded tri-state driver, in turn, outputs on line 2124 as signal DIO to a NAND gate 2125. NAND gate 2125 is operative to output a signal NPROGDIS/S on line 2126 upon concurrent receipt of inputs of lines 2124 and 2130. NAND gate 2120 also is operative to output a signal NPROGDIS/S1 on line 2150 to OR gate 2140 having inverted inputs. A NRESET signal on line 2160 is received from the CPUM, as described in supra-referenced application, for outputting to an inverter 2170. Line 2160 has a grounded capacitor 2180 for eliminating transients. Inverter 2170 bifurcatedly outputs on lines 2180 and 2190 to NAND gate 2200 and NAND gate having inverted inputs 2210. The signals on lines 2180 and 2190, as described supra, are designated as NRESET-1.

A resistive network 2220 identical to resistive network 1890 described supra provides a bi-input to NAND gate 2210 described supra where said input is received on line 2230. NAND gate 2210 upon receiving concurrent inputs, will output on line 2240 as signal NPROGDIS/S3 to OR gate 2140. A PROGENARPM signal on line 1700 is received from a portion of the ready controls 265B that will be described infra and herein is inputed to NAND gate 2200. Upon concurrent receipts of inputs, NAND gate 2200 will output a NLATCH signal on line 2250 to inverter 2260. Inverter 2260 will output a LATCH signal on line 2270 to NAND gate 2120. Upon alternative receipt of inputs, OR gate 2140 will output on line 2280 as signal PROGDISARPM/S to a D type flip-flop 2290 at its C input. A resistive network 2300 which is identical to resistive network 2220 outputs a biasing control signal on line 2310 designated PU1 to each of the clear (CLR) inputs of D type flip-flops 2290, 2320, 2330, and 2340. Biasing line 2310 also bifurcates to line 2350 to input to NAND gate 2360. NAND gate 2360 also receives a signal on line 2370 designated NPH1 which is the negation of the phase 1 synchronization clock signal received from the CPUM, as described in the supra-referenced application. NAND gate 2360 is operative to output a signal on line 2380 designated as PH1 to the clock inputs (CK) of D type flip-flops 2290, 2220, 2330 and 2340.

Line 2380 is also biased by a resistive network 2390 having a pair of commonly terminated resistors, the first being a grounded resistance of 1.07k ohms, and the second being a resistor of 213 ohms which is attached at its opposing end to a +5 volts regulated d.c. voltage on line 270 from the bias regulator 260. D type flip-flop 2320 receives its data input on line 2400 at terminal D which is grounded in this case. A data output signal designated as /DR:SPARE/on line 2410 is provided by flip-flop 2320 on terminal QD proceeds to the CPUM, as further described in the referenced supra application. A signal designated as NSYNC-TS on line 2420, from the supra-referenced CPUM of the supra-referenced application, proceeds to inverter 2430 where it is outputed on line 2440 as signal SYNC. The SYNC signal on line 2440 proceeds to the data input terminal designated as the A terminal of D type flip-flop 2340. It also bifurcates to the SR or shift-right terminal of the D type flip-flop 2340. The data output signal of the D type flip-flop 2340 which is produced at terminal QA is outputed on line 2450, where the signal is designated as /DLISYNCD/, and then proceeds to NAND gate 2460. NAND gate 2460 upon concurrent receipt of inputs will output on line 2470 where the signal is designated as NADDHERE and will proceed to the data input terminal designated as the B terminal of D type flip-flip 2330. The data output terminal of D type flip-flop designated as QB will output on line 2480 where the signal is designated as NADDHEREDLT where it will proceed through inverter 2490. The logically inverted signal from 2490 will be produced on line 2500 where the signal is designated as NADDHEREDLT to be introduced to the input of supra-mentioned NAND gate 2080. Address signals A00–A15 on subaddress bus 80 are received by ready control 265B for control thereof. In particular, address signals A00–A07 indicated as line group 2510 are inputed to NAND gate 2520. Address line A08–A15 are inputed on line group 2530 to NAND gate 2540. It will be noted that NAND gate 2540 has one inverted input corresponding to address line A11 of group 2530. Upon concurrent receipt of inputs, NAND gates 2520 and 2540 will output on lines 2550 and 2560 as signals NLOWADDRH and NUPAADRH, respectively, to NAND gate 2570. It will be appreciated that NAND gate 2570 has both of its inputs logically inverted. Upon the concurrent receipt of inputs, NAND gate 2570 will output on line 2580 and NIDISADDRH to an inverter 2590. Inverter 2590 will output a logical indication thereof on line 2600 where the signal is designated as DISADDRH to supra NAND gate 2460.

It will be appreciated that implementation of the memory hierarchy described supra depends upon the decoding of addresses inputed to the first and second level address recognition PROMS 750 and 920, respectively, of the Address Decoder 190 into operative control signals through logic gating. Particularly, if addresses A7–A15 are decoded by PROM 760 outputs on both line 1130 as signal NBPROM and line 1140 as signal NROM, then this implies address overlap or conflicting recognition by both Bulk PROM 170 and Contingency ROM 105A-B. Accordingly, to institute a predetermined hierarchal ordering as between Bulk PROM 170 and Contingency ROM 105A-B, NAND gate 1170, upon being enabled by a Bulk PROM 170 signal, will output a disenabling signal on line 1195 to NAND gate 1210. NAND gate 1210 will thus be disenabled from throughputing the Contingency ROM 105A-B inputed thereto. Thus where Bulk PROM 170 and Contingency ROM 105A-B signals conflict, Bulk Prom 170 will prevail by disenabling Contingency ROM 105A-B.

If addresses A4–A15 are decoded first by First Level address Recognition PROMS 750 and then by PROM 870 of Second Level Address Recognition PROMS 920 such that a NPATCH signal on line 980 is outputed therefrom, then a patch PROM 180 address has been recognized. Next, if a Contingency ROM 105A-B address has been recognized also, then NPATCH on line 980 will disable NAND gate 1210 in a manner identical to supra-described subrogation by bulk PROM 170. Accordingly, with Contingency ROM 105A-B disabled, Patch PROM 180 effectively subrogates Contingency ROM 105A-B.

If Bulk PROM 170 and Patch PROM 180 control signals are both present, then Patch PROM 180 will subrogate Bulk PROM 170 in the hierarchal ordering as follows. The normal strobe enabling control signal for Bulk PROM 170 is received on line 1200 by terminal 16 of Demultiplexer 1310 in the Bulk PROM 180. A NPATCH or Patch PROM signal may be received on line 1030 at the data input 1C terminal of the same Demultiplexer 1310 which will act to disable the same if received. Once so disabled, the Patch PROM 180 will have effectively subrogated the Bulk PROM 170.

Contingency ROM 105A-B is able only to subrogate on-board ROM in the CPUM in the absence of both Bulk PROM 170 and Patch PROM 180. Subrogation by Contingency ROM 105A-B of on-board ROM in the CPUM is performed by receipt of a NROM signal on line 1140 by the CPUM. In the absence of Patch PROM 180, Bulk PROM 170 on Contingency ROM 105A-B control signals, then on-board ROM in the CPUM receives hierarchal priority by default.

A. Hardware Operation

In regards to the memory hierarchy mentioned supra, the various memory categories including contingency ROM 105A-B, Bulk PROM 170, Patch PROM 180, and outboard ROM that may be present in a memory system including memory lodged in ARM 10 and CPUM, respond to memory request according to the following hierarchal order as given in the infra table:

| Module | Type | Precedence |
|---|---|---|
| ARMS (10) | PROM PATCH (180) | First |
| ARMS (10) | Bulk PROM (170) | ↓ |
| ARMS (10) | Contingency ROM (105A-B) | ↓ |
| CPUM (—) | On-Board ROM (not shown) | Last |

For a given memory request, whichever of the memory categories of ARMS 10 or CPUM which is highest or first in the priorized order and which recognizes the given address on main address bus 30, will take precedence in responding over any other overlapping memory category that also recognizes the given address on main address bus 30. However, this hierarchy is conditional on the ARMS 10 being in an enabled state to respond, that is, it is not disenabled by the page enable logic (PAGENABLE) on line 1810. When a disable function occurs, entire ARMS 10 is effectively disabled from responding to memory requests on the system bus 20 and therefore may hierarchically default to enable on-board ROM in the CPUM.

In regards to contingency ROM 105A-B, up to 64KB of mask programmable MOS read-only memory is provided in the disclosed embodiment. The contingency ROM 105B is able to permit proper increments of 2KB conforming to the 2Kx 8-bit organization of the device where there is normally 2KB per given ROM chip. The contingency ROM 105A-B is designed such that the addressing A00–A10 and chip select A11–A13 bit patterns of the ROM chips 390A-H, 400A-H, 410A-H, and 420A-H are equivalent to the addressing and chip select bit patterns of the CPUM or on-board ROMS for respective address ranges; in other words, ROMS of the same address range may be fully transferable between the onboard ROMS of the CPUM. Each physical ROM location may be associated with one unique 2KB range of address on a 2K boundary.

The address recognition ranges of the contingency ROM 105A-B are settable to any 2KB ranges falling on any 2K boundary. It need not be contiguously assigned. System addressing far beyond 64KB may be accommodated by means of a paging technique. Page selection hardware (not shown), either hardware or software controlled, may be assumed to be external to the ARMS 10. The ARMS 10 may be able to receive a signal from paging hardware (not shown) called PAGENABLE on line 1810, which will enable/disenable all memory categories on the ARMS 10 from responding to any memory request. PAGENABLE on line 1810 may be an open collector signal with a provision for optionally connecting to a pull-up resistor (not shown). The PAGENABLE function may disenable all ARMS 10 memory categories including contingency ROM 105A-B, patch PROM 180, and bulk PROM 170 from responding to a memory request on a system bus 20.

In regards to the patch PROM 180 of FIGS. 1 and 4A-B, specific PROMS 760-770 and 870-880 are programmed to provide address recognition logic, which specifies 16-byte segments of memory to be patched, and other PROMS 1360A-B are provided as data storage devices which contain the revised bit patterns for the patch memory segments. One of the address recognition PROM sets 760–770 is also used in the logic to specify effective address ranges for contingency ROM 105A-B and bulk PROM 170.

Figure 13:
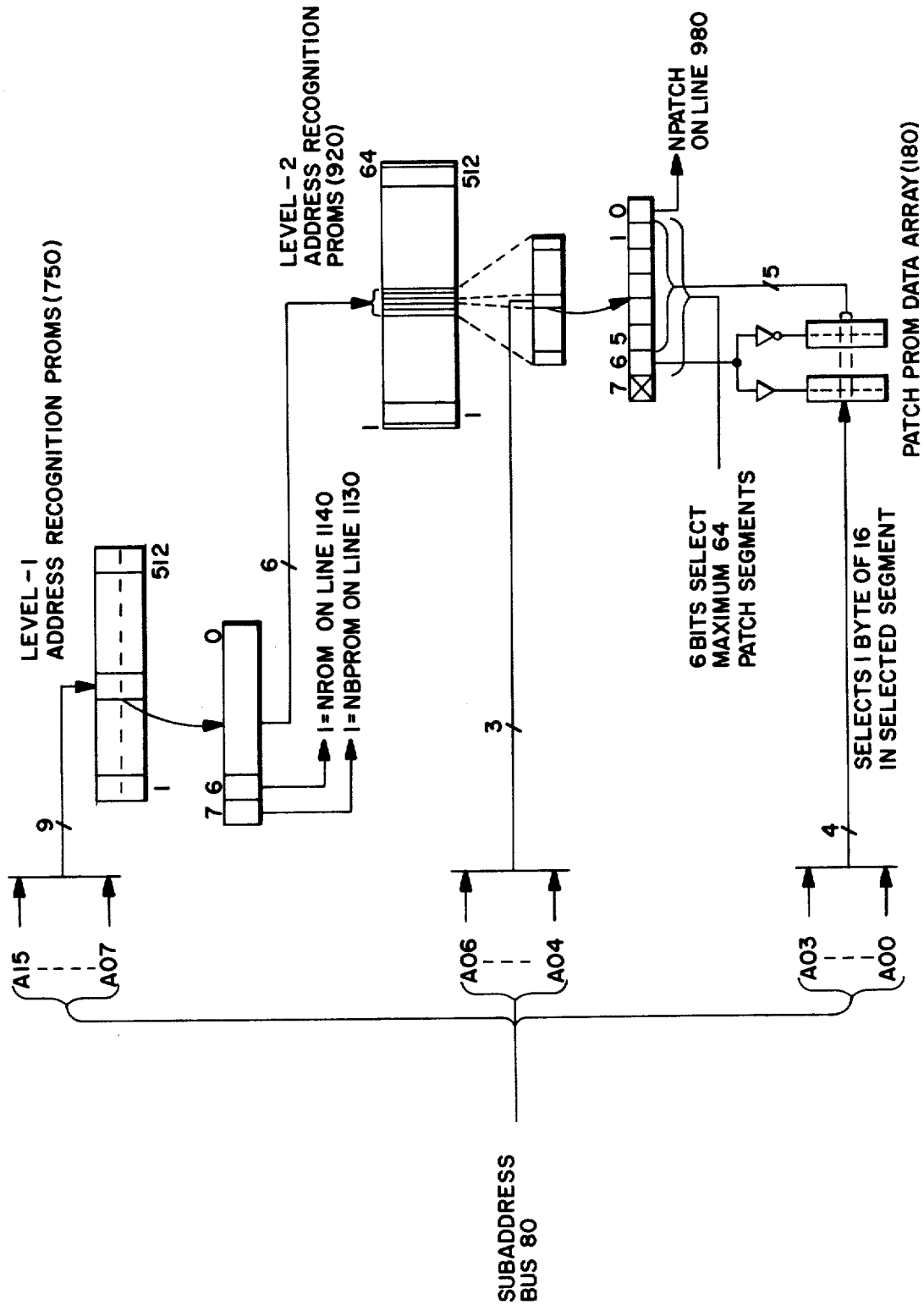
FIG. 13 is a diagram describing the mode that the decode control module of FIG. 3 uses to order the accessing of the patch PROM of the alterable PROM memory of FIG. 4.
Figure 14:
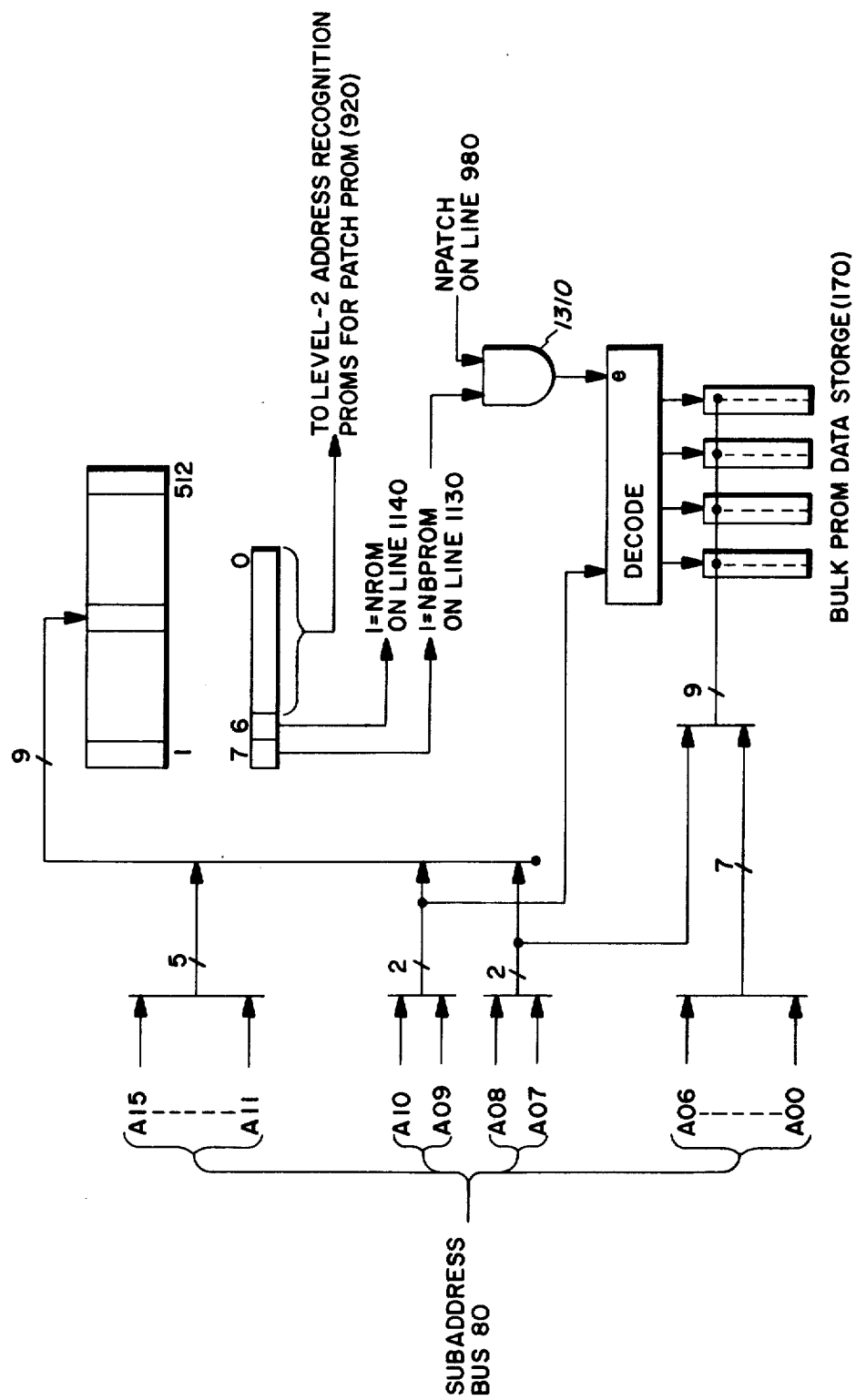
FIG. 14 is a diagram describing the mode that the decode control module of FIG. 3 uses to order the accessing of the bulk PROM of the alterable PROM memory of FIG. 4.

Two levels of PROM address recognition 750 and 920 are employed as shown operatively in FIG. 13. The first level address recognition PROMS 750 receives the uppermost line bits (A7–A15) of the 16-bit address on subaddress bus 80). This selects one unique location of the total 512 PROM locations. The overall 64K memory space, therefore, is partitioned into 512 areas, each consisting of 128 bytes (512 × 128 = 65,536). The two output signals KRU on line 220 and NBPHERE on line 205 from the first level PROM set 750 specify which 128-byte area of memory space is to be effective on the ARMS 10 for contiguous ROM 105A-B and Bulk PROM 170 utilization, respectively. It should be noted that the memory hierarchy discussed supra prevails in the event both contingency ROM 105A-B and Bulk PROM 170 are specified for the same 128-byte area. Restrictions as to the assignment of Bulk PROM 170 bits in the first level address recognition PROMS 750 apply and are discussed infra.

The remaining six output bits (ASEL0–ASEL5) on line group 860 from the first-level address recognition PROM pair set 750 are utilized by the second level address recognition PROM pair set 920. For each of the 512 locations of the first PROM pair set 750, these six bits (which form 64 unique combinations) are coded to point to one out of 64 groups of 8-bytes in a second level PROM pair set 920 (8 × 64 = 512). For each 128-byte memory area in which no patch segment is to occur in patch PROM 180, the six output bits on line group 860 of the corresponding first level PROM set 750 location will be coded to point to a group of eight bytes in the second level PROM set 920; this common group will be used in logic to indicate no patch NPATCH PROM 180.

For each 128-byte memory area in which at least one patch segment in patch PROM 180 is to occur, the six output bits on line group 860 of the corresponding first level PROM set 750 location will be coded to point to a unique group of eight bytes in the second level PROM pair set 920. Since there are only 63 remaining groups, a maximum of 63 of the original 512 128-byte memory areas may be specified to contain patches in patch PROM 180. That is, once a total of any random 63 128-byte areas of memory have been specified for patching in patch PROM 180, none of the remaining 449 128-byte areas of memory may be specified. This insures that up to 63 patch segments may be specified randomly in the memory space, a patch segment and patch PROM 180 being on a 16-byte boundary.

Through additional address bits (A06–A04) on subaddress bus 80 are inputed into the second level PROM pair set 920 points to one of the eight bytes within the selected group. This byte corresponds to 16-byte segment of a specified 128-byte memory area (8 × 16 = 128). For each group, the 8 bytes (8 segment pointers) within the group are coded as follows: Bit position 0 indicates whether (=0) or not (=1) the corresponding 16-byte segment of memory is to be patches in patch memory 180; if it is to be patched, then six bits (6-1) select a unique 16 bytes of the data out of the data or patch PROMS 180. Otherwise, the six bits have no effect. Bit 7 is not used. The absolute maximum number of patches in patch PROM 180, therefore, is 64 but these are constrained to reside in the 63 areas of memory of patch PROM 180 specified by the level-1 address recognition PROM pair set 750. The patch PROM 180 is designed to permit the depopulation of PROM devices 1360A-D to the minimum number required depending on the number of patches implemented thereto.

A selected patch segment in patch PROM 180 will always consist of 16 bytes, and all 16 bytes will be coded even if only one byte or one bit is to be altered by the patches thereto. Unaltered bits in the patch segment of patch PROM 180 must be coded identically to the corresponding bits in the original memory segments thereof.

In regard to Bulk PROM 170 of FIGS. 1 and 4, it is designed to permit physical population increments of 512 bytes of 2KB of electrically programmable read-only memory. As a total 512 128-byte areas of the 64KB memory space specified by the level-1 address recognition PROM set 750, a maximum of 16 areas may be designated effective for Bulk PROM 170 (16 × 128 = 2KB). However, these designated 16 areas may not be randomly chosen as in supra patch memory 180 and are subject to additional consideration as discussed infra. An operative shown in FIG. 14, address bits A10–A07 on subaddress bus 80 are inputs to not only the level-1 address recognition PROM set 750, but also directly into the Bulk PROM data storage 170. Therefore, only the five high-order address bits (A15–A11) on subaddress bus 80 are unique to the level-1 PROM set 750 relative to Bulk PROM 170 address recognition in the address decoder 190. The 32 combinations formed by these five high-order address bits on subaddress bus 80 effectively partition the memory space in Bulk PROM 170 into 32 unique groups of 2KB each.

Bulk PROM 180 may be assigned either by one of the two following methods. First, such that all 16 128-byte ranges of the Bulk PROM 170 effective addresses are entirely contained within one of the unique 32 groups of 2KB. Secondly, and alternatively, such that the Bulk PROM 170 128-byte ranges of respective addresses are scattered amongst more than one unique group of 2KB. Both of the supra cases are discussed infra, but only the former is used in the preferred embodiment.

If all 16 128-byte ranges of Bulk PROM 170 are to be designated within a single 2KB group out of the 32 such groups, then: first, the NBPROM bits on line 1130 contained in the 16 locations of the level-1 address recognition PROM set 750 corresponding to the 128-byte areas within the designated 2KB groups of addresses must be set to 0 (enable), or 1 (disenable). All remaining NBPROM bits on line 1130 in the level-1 of PROM set 750 must be set to 1 (disenable); secondly, within the 16 level-1 locations, NBPROM bits on line 1130 will be assigned by software in sets of four, each set associated with 512 bytes of Bulk PROM data storage 170 lying on a 512-byte boundary within the effective 2KB range. Thus, advantage may be taken of the physical population increments of the Bulk PROMS 170 as follows:

| Bulk PROM (170) Capacity | PROM Device (1330A-H) Count |
|---|---|
| 0.5KB | 2 |
| 1.0KB | 4 |
| 1.5KB | 6 |
| 2.0KB | 8 |

Thirdly, Bulk PROM 170 assigned, as described supra, may be assigned mutually exclusive addresses with other memory or may overlay other memory according to the memory hierarchy by being mutually inclusive as described above, but not both due to software constraint. The former or mutually exclusive case is recommended when Bulk PROM 170 is to provide extension memory in support of patch PROM 180. The latter or mutually inclusive case is recommended when Bulk PROM 170 is itself to act as a large patch. In an alternative embodiment, the 16 128-byte group of Bulk PROM 170 may be assigned up to 16 different 2KB groups out of a total 32 total such groups. The following restrictions apply thereto: First, the NBPROM bit on line 1130 in each of the up to 16 locations of the level-1 address recognition PROM sets 750 corresponding to the 128-byte areas of memory to be designated for Bulk PROM 170 must be set to 0 (enable). All remaining NBPROM bits on line 1130 in the level-1 PROMS 750 must be set to 1 (disenable); secondly, address bits A10–A07 on subaddress but 80 must be a unique combination in each of the different 2KB groups designated for Bulk PROM 170. That is, once an A10–A07 is associated with one 2KB groups of addresses, it may never be used in another 2KB group of addresses. This is due to the overlap of address lines A10–A07 on subaddress bus 80 with both the level-1 recognition PROMS 170 and the Bulk PROM storage array 170; thirdly, Bulk PROM data storage PROMS 170 will be populated depending on the Bulk PROM 170 address assignments; and fourthly, Bulk PROM 170 assigned as described above may be assigned mutually exclusive addresses with other memory categories or may overlay other memory categories of the ARMS 10 as described in the prime embodiment supra for mutually exclusive addressing. It will be noted that the contents of Bulk PROM 170 may be replaced by patch PROM 180 in 16-byte segments just as contingency ROM 105A-B may be.

In regards to diagnostic isolation, the general objective of the diagnostic isolation consideration on the ARMS 10 is to facilitate isolation to a failing board. The fault detection mechanism is a software check sum technique requiring a small amount of program memory in on-board ROM of the CPUM for the check sum routine and associated values therefor. The giagnostic isolation strategy inclusive of the ARMS 10 is as follows: first, ARMS 10 and on-board ROM of CPUM are both tested according to a complete memory page test via the infra steps. A given memory location enters the routine and is tested according to the total memory check sum. If it passes the test, there are no faults; otherwise if it fails, the ARMS 10 is then enabled. Secondly, next only the on-board ROM In CPUM is tested by testing the unpatched, non-extended portion of the given page via the infra steps. The supra given memory location is tested according to the CPUM check sum. If it passes, the fault is in the ARMS 10; otherwise if it fails, the CPUM is in a fault mode. The above strategy assumes the check sum routine resides in the CPUM ROM with the following two characteristics: first, it contains in the memory location the range of the addresses tested; and secondly, it also contains in memory a check value for comparison with a calculated value. These memory locations should contain values only for the check sum associated with on-board ROM in the CPUM. If patches 180 or Bulk PROM 170 exists, these same locations will be patched with new values reflecting the new range and check sum. By disenabling the ARMS 10, the check sum value in range which were patched were also disenabled and the check sum reduces to a CPUM test.

A diagnostic isolation strategy requires that programmatic control over the ARMS 10 disenable function be provided. To accomplish this, the ARMS 10 will respond to a memory-write operation control signal on line 2040 and instruction signal whose address is X' F7FF' on subaddress bus 80, which is a location of a 1-bit flag RAM memory on the CPUM. If it is desired that this bit and flag RAM not be altered, then bit D7 of the data byte on the main instruction bus 50 associated with the write instruction must be coded identically to its prior state.

A latch or D type flip-flop 2290 in the ARMS 10 will be set to a 0 (disenable) or 1 (enable) on line 1700 in correspondence to a value coded for an effective bit position of the data byte on main instruction bus 50 associated with the write. The effective bit position may be selected on the ARMS 10 jumper set 2121. The effective bit selection capability allows the software to individually enable/disenable each ARMS 10 in a multiple ARM system environment. The latch or D type flip-flop 2290 in each ARMS 10 will individually be set to 0 (disenable) or 1 (enable) upon reset (power-on) on line 2160 depending on a on-board jumper in set 2121. The absence of the jumper in set 2121 will cause the latch 2290 to come up in the disenabling (0) state; the presence of the jumper 2121 will cause it (2290) to come up in the enabling (1) state. This plan provides flexibility to assure that a master memory page is present in a system after power-on. It will be noted that the ARMS 10 will not drive NRADY-TS on line 1930 in response to the write command to address X' F7FF' on subaddress bus 80.

B. Software Operation

The function of the software support program 3005 for ARMS 10 is to provide a means of generating the memory image files explained infra for the PROMS which populate the ARMS 10. Specifically, these files are used to generate the code requirements for: (1) the level-1 decode PROM 750, (2) the level-2 decode PROMS 920, (3) the patch data PROMS 180, and (4) the Bulk PROMS 170 which have an address range mutually exclusive from the original program. Bulk PROMS 170 which correlate the original program and all contingency ROMS 105A-B and on-board ROMS generated by a linker program (not shown). The ARMS software support program 3005 is designed to generate a minimum number of decode and patch data PROMS 750, 920 and 180, as referred to in FIGS. 13 and 14, for decode level values. The number of Bulk PROMS 170 is a function of the memory location file 3030 explained infra.

Figure 15:
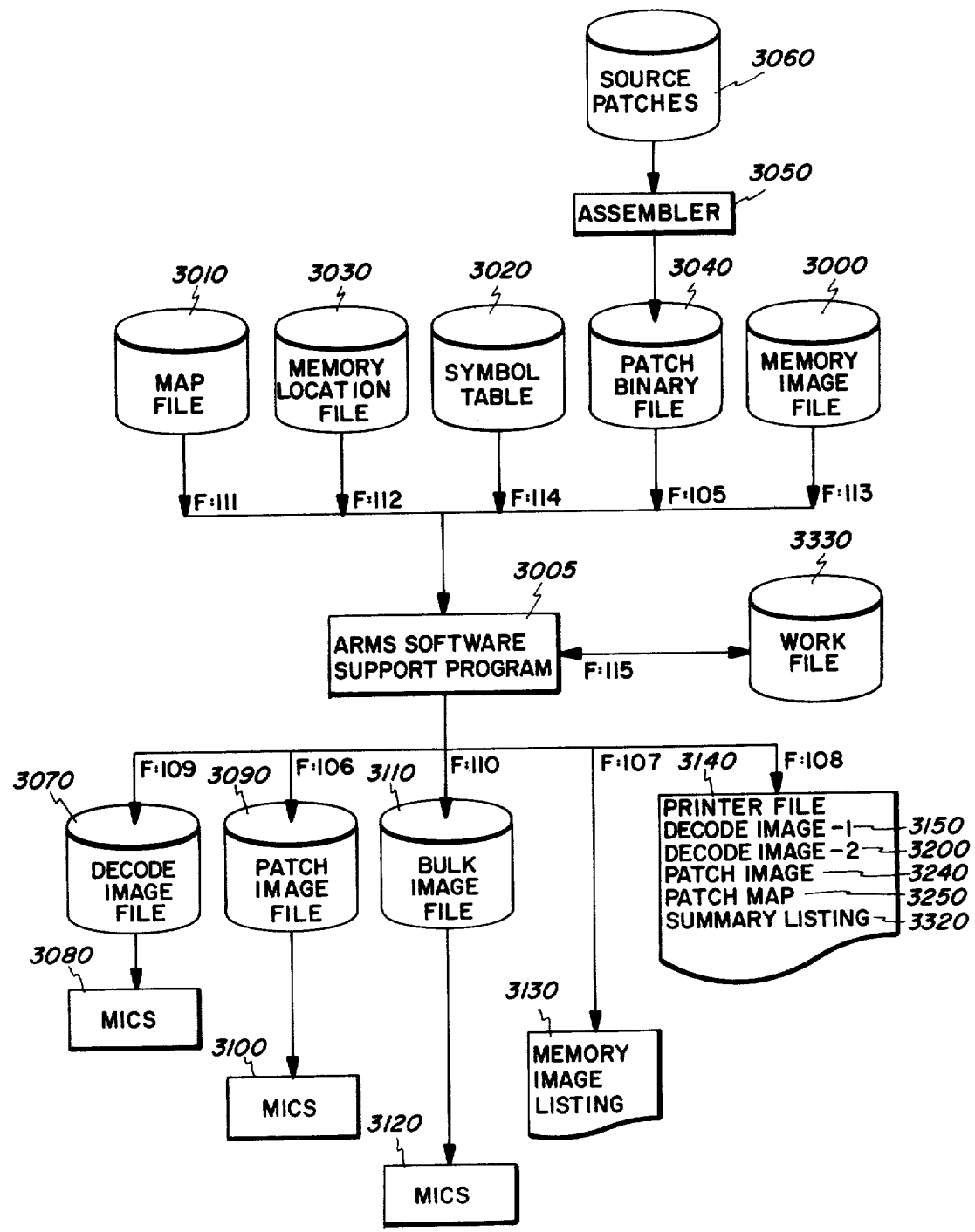
FIG. 15 is an interconnected view of all the input/output patch files used by the ARMS software support program as stored in the auxiliary ROM memory system of FIG. 1.

In regards to file descriptions, therefore, referral to the patch files 3002 of FIG. 15 gives a view of all the files used by the ARMS software support program 3005. Particularly, the ARMS software support program 3005 has five input files. First, the memory image file 3000 is the program being patched. It is generated by the linker. Any Bulk PROMS 170 which overlay the original program must be in its file 3000. Secondly, the map file 3010 is the same file which is the same file used in the linker ROM which generates a memory image file 3000. The map file 3010 may be modified to expand memory ranges or to modify check sum parameters. If check sums are changed, the appropriate application program changes must also be made. Refer to Appendix A in FIG. 22 for a description of the map file 3010. Thirdly, a symbol table file 3030 is generated by the linker. This file contains the addresses for all the Defines associated with the memory image file 3000. The patch file 3040 infra may reference the enables through the use of a Refer command in the source program. Fourthly, the memory location file 3030 format is the same as the map file 3010 format. This file 3030 is used to define the on-board in contingency ROM 105A-B and Bulk PROM 170 memory ranges. Columns 1-2, and 4-6 may contain the values described. Particularly for Columns 1-2, RM may be entered for contingency ROM 105A-B or BP for Bulk PROM 170. Likewise, for Columns 4-6 ABS for contingency ROM 105A-B, INC for inclusive (overlay) Bulk PROM 170 or EXC for exclusive (extended) Bulk PROM 170. The remaining columns contain the values as described for the map file 3010. Columns 8-11 are used to specify the starting address. The starting address must be on a 2K boundary. Columns 13-16 are used to specify the ending address. For contingency ROM 105A-B, the ending address must be a multiple of 2K minus 1, for example, the number 1FFF. For Bulk PROM 170, the ending address must be a multiple of 512 minus 1, for example 1FF. The address range for Bulk PROM 170 must not exceed 2K bytes.

Contingency ROM 105A-B and inclusive Bulk PROM 170 require that Columns 17-34 be blank. These columns normally specify round, fill, and check sum parameters. However, since contingency ROM 105A-B and inclusive Bulk PROM 170 are processed by the linker, these values are covered by entries in the map file 3010. The round, fill, and check sum parameters are entered for an exclusive Bulk PROM 170. There may be multiple contingency ROM 105A-B descriptors in the memory image file 3000. Each contingency ROM 105A-B descriptor must contain a unique memory range. There may be no more than one Bulk PROM 170 descriptor in the memory image file 3000. Column 23 (fill) for exclusive Bulk PROM 170 must specify fill character or U (no fill). M (no load) is not allowed. If there is no contingency ROM 105A-B and no Bulk PROM 170, the fill must be set to 0 or must be set to NULL.

The patch file 3040 is generated by an Intel 8080 cross assembler 3050. The input to the cross assembler 3050 is the collection of patches 3060 in source code configured as a single file. Backward origins and the redefinitions of memory locations are allowed. The ARMS software support program 3005 will separate exclusive Bulk PROM 170 code and patch data PROM 180 code as defined by the Bulk PROM 170 address base defined in a memory location file 3030.

The ARMS software support program 3005 has five output files described as follows: first, the decode image file 3070 is a standard memory image file 3000 format. Level-1 decode 750 will appear as memory from 0-5111. Level-2 decode 920 will appear as memory from 512-1023. Said file is input to MICS 3080 for the generation of PROM tapes, makefrom drawings, and PROM i.d. assignments; secondly, the Bulk PROM 170 memory image file 3090 is in standard memory image file 3000 format. The addresses in the file are the true addresses as specified in the memory location file 3030. This file is input to MICS 3100 for the generation of PROM tapes, makefrom drawings, and PROM i.d. assignments; thirdly, the PROM or detached memory 180 image file 3110 is in standard memory image file 3000 format. The patch data PROM 180 would be given addresses shown in FIG. 18. This file is input to MICS 3120 $\phi$ for generation of PROM tapes, makefrom drawings, and PROM i.d. assignments; fourthly, a memory image listing 3130 is in the same format as in the memory image listing (not shown) produced by the linker. The listing shows the contents of memory with all patches incorporated. Also, check sum data is summarized. Fifthly, a printer file 3140 contains the five listings in the order given infra: first level decode 3150, second level decode listing 3200, patch level decode listing 3240, patch PROM map, and ARMS summary report. The first level decode listing 3150 is shown in FIG. 16. This listing shows the address lines 3160, the NROM bit value 3170, the NBPROM bit value 3180, and the second level group number value 3190. The first level decode listing 3150 is in address line 3160 order. The address line 3160 increases first within a column and second from column to column and third from page to page. Values for address lines 3160 which point to all 1's (NROM = 1, NBPROM = 1, second level group number equals $3F_{16}$) are not shown. The order of assignment of second level pointers 3190 in hexadecimal is 30-3E, 00-2F. ROM 3170 is the value of the NROM bit, referring to FIG. 13, Bulk PROM 1080 is a value of NBPROM bit, and LVL2 GRP #3190 is the value of bits 5-0 of the first level decode 3150 byte.

Figure 20:
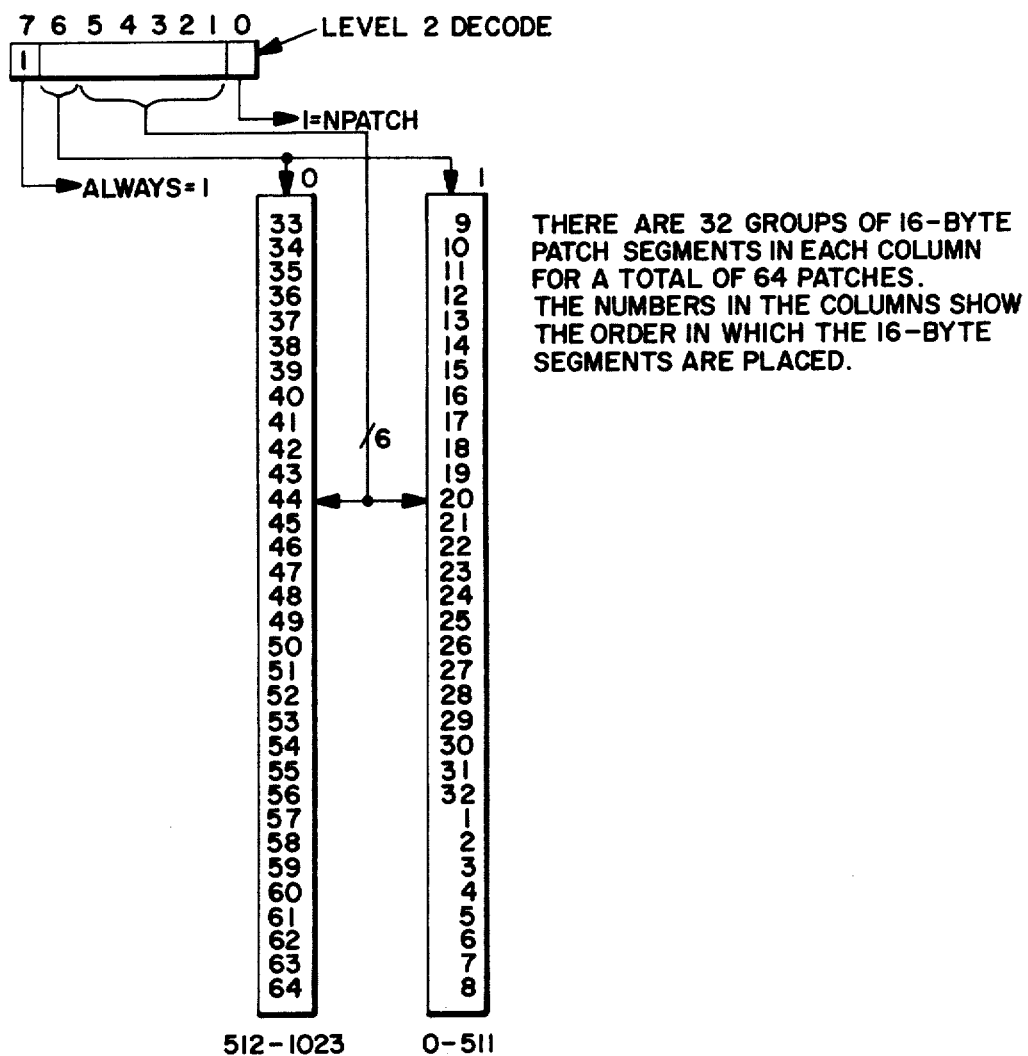
FIG. 20 is a Sixteen Byte Patch Placement table for the Second Level Decode Listing of FIG. 17.

A second level decode listing 3200 is shown in FIG. 17. A listing 3200 shows the address lines 210, the second level group number 3220, and the patch PROM 16-byte address pointer 3230. This listing 3200 is ordered accordingly to the second level group number value 3220, first by column, and second by row. The patch PROM address 3230 represents bit 6-1 of a second level decode 3200 byte. Bit 7 of a second level decode 3200 byte is always 1. Second level of decode 3200 values are not shown when NPATCH on line 980 (bit 0) equals 1. The order of assignment of patch PROM address 3230 values (bits 6-1) in hexadecimal is 38-3F, 20-37, 00-1F. In the second level group number 3220, X ($x = 0$-7), X represents which of the eight 16-byte patches occurred. Placement of 16-byte patches is shown in reference to FIG. 20.

The patch image listing 3240 will treat the patch data as starting at 0 and continuing at 512-byte increments up to 1K. Refer to FIG. 18 for the listing format.

Referring to FIG. 21, patch PROM map 3250 is a seven-column listing which reports the following data including storage patch 3260, object patch 3270, object patch address 3280, PROM address 3290, 16-byte repeat 3200, byte repeat 3310, and check sum. It will be noted first that source patch 3260 is a count of the patches in the source patch file 3060. The counter is incremented for every occurrence of an assembler 3050 of the Origin statement which changes the value of the location counter. This number will appear in assembly listing if patch: is set to 1 at the start of the patch code. Secondly, object patch number 3270 is a count of the distinct 16-byte patches encountered. A repeat of a prior 16-byte address will show the prior count. Thirdly, patch address 3280 is the hexadecimal starting address (XXX0) of the 16-byte segment being patched. Fourthly, PROM address 290 is the hexadecimal address (0-2K) in the patch data PROM 180 where the 16-byte patch is placed. Fifthly, check sum (CHK SUM) will print an asterisk if the PROM address 3290 has a new check sum value. Sixthly, 16-byte repeat 3300, if the 16-byte segment reoccurs in the patch file 3240, the highest value of patch 3260 is shown. As an example, suppose that there are 35 patches contained in patch data PROMS 180. A subsequent run of the patch program will increase this to 40 patches. If among the first 32 patches (32 MAX for 2 PROMS) none had a 16-byte repeat 3300 value greater than 32, then the first two data patch PROMS 180 did not change, and need not be reblown. However, if there is now a 16-byte repeat 3300 value of say 38 then data in the first two patch PROMS 180 has changed. If there has not been any reoccurrence of the 16-byte segment, this entry will be blank.

Seventh, byte repeat 3310 indicates that at least one byte in the 16-byte segment has been patched more than once. This is indicated by an entry asterisk (*). Otherwise, entry will contain blanks. This field 3310 differs from the 16-byte repeat 3300 in that, for example, a patch for location 9, and then later to location 12 would have a patch number for 16-byte repeat 3300, and the blank for byte-repeat 3310. Naturally, an asterisk (*) in byte-repeat 3310 would always have a patch number in 16-byte repeat 3300 (though not necessarily a corresponding patch #). The byte-repeat 3310 is a reminder to the user that the same location has been patched more than once. The ARMS summary report 3320 is shown in FIG. 19. A report 3320 shows the required number of decode PROMS 750 and 920, Bulk PROM 170, and patch data PROMS 180, and the contingency ROM 105A-B for ARMS 10. The report 3320 also shows the space available for subsequent patches.

In addition, there is an input/output work file 3330 which is used to contain 3KB segments of the input memory image file 3000.

In regards to Bulk PROM 170 constraints, Bulk PROM 170 must start on a 2KB boundary and occurs in 512-byte segments up to a maximum of 2KB contiguous bytes. Level-1 bulk PROM decode 750 values are determined strictly by the memory location file 3030. Code placement in bulk PROM 170 is determined by the code according to location counter values. Bulk PROM 170 address base must either be entirely within the current address memory base as defined by the map file 3010, or must be entirely outside the current address base. Exclusive Bulk PROM 170 code (outside the address base) must be entered through the patch file 3040. Inclusive, Bulk PROM 170 code (inside the address base) must be incorporated in a memory image file 3000.

In regards to the patch PROM 180 constraints, a maximum of 63 of 512 128-byte areas may contain patches. A maximum of 64 16-byte segments may contain patches. Any 16-byte patch segment that is partially filled with patch code will be filled in by existing code. If there is no existing code (unfilled specified in the linker), "ones" will be filled in. Patch file memory 3040 addresses, rounded to the top of a 16-byte segment, must be covered by a map file 3010 entry. The order of patch code in the patch file 3040 determines the placement of data in the patch data PROM 180, as seen in FIG. 19. After 32 distinct segments of 16-byte patches have been processed, subsequent extensions to the patch file 3040 will not change the pattern generated for the first 32 patches. This assumes that the extensions do not address any of the original 32 16-byte segments. It is advised that, in general, new patch code be placed at the end of the patch file 3040. Unused areas of a partially filled patch data PROM 180 are filled with 1's.

The PROM population may be defined in terms of level-1 and level-2 decode PROMS 750 and 920, and patch and bulk PROMS 180 and 170, respectively, as described infra. In regards to level-1 decode 750 for PROMS 170 and/or 180 population, if there is no Bulk PROM 170, no contingency ROM 105A-B, in less than 16 128-byte areas, have patches, level-1 decode 750 will require one PROM. Otherwise, level-1 decode 750 will require two PROMS. In regards to level-2 decode 920 for PROM 180, patch PROM 180 population, level-2 decode, line 20, requires one PROM when there are 1–8 patches, and two PROMS when there are more than eight patches. In regards to patch data PROMS 180 for PROM population, two patch data PROMS 180 are required for every 32 distinct 16-byte segments patched. In regards to Bulk PROM 170 for PROM population, two Bulk PROMS 170 are required for every 512 bytes of bulk data patches. However, the number of Bulk PROMS 170 generated is the function of the address space defined in the memory location file 3030.

Examples of single byte insertion, single byte overlay, multiple patches, exclusive Bulk PROM 170 and inclusive Bulk PROM 170 are as follows where all addresses are in hexadecimal form. For single byte insertion, assume the current program goes from 0–3FFF. Currently at location 2CO the following code exists.

| 2C0 | INX  | B     |
|-----|------|-------|
| 2C1 | MVI  | A,127 |
| 2C3 | CALL | LBL1  |
| 2C6 | DCX  | D     |

If one supposes that a MOV H,A instruction is to be inserted between the INX and MVI instruction, the patch code would be as follows.

|      | ORIGIN | 2C1  |
|------|--------|------|
| 2C1  | JMP    | 4000 |
|      | ORIGIN | 4000 |
| 4000 | MOV    | H,A  |
| 4001 | MVI    | A,127 |
| 4003 | CALL   | XXXX |
| 4006 | JMP    | 2C6  |

The above sequence would generate two patches, 2CO-CF and 4000-400F. Additional patches may be generated for modified check sums. The map file 3010 must be expanded from 3FFF to at least 4008 to include the patch base. The memory location file 3030 is not required. If LBL1 had been Defined in the original source program, it could have been referenced in the patch program if the patch program contained a statement Refer LBL1.

For single byte overlay, and exemplary location 3A5, a DB 5 should be a BB 6. Accordingly, the patch code would be as follows.

|     | ORIGIN | 3A5 |
|-----|--------|-----|
| 3A5 | DB     | 6   |

This sequence generates one patch 3AO-3AF. Patches for modified check sums may also be generated. In a given example, the map file 3010 would not need to be modified and in memory location file 3030 would not be used.

For multiple patches, multiple patches would consist of a concatenation of the separate patches. Exemplarily, if both cases A and B are desired then the patch file 3040 would be as follows.

|      | ORIGIN | 2C1   |
|------|--------|-------|
| 2C1  | JMP    | 4000  |
|      | ORIGIN | 4000  |
| 4000 | MOV    | H,A   |
| 4001 | MVI    | A,127 |
| 4003 | CALL   | XXXX  |
| 4006 | JMP    | 2C6   |
|      | ORIGIN | 3A5   |
| 3A5  | DB     | 6     |

For exclusive Bulk PROM 170 given the following code:

|     |     |      |
|-----|-----|------|
| 20D | DCR | D    |
| 20E | MOV | A,M  |
| 20F | INR | B    |
| 210 | CMP | M    |
| 211 | JZ  | LBL1 |
| 214 | ORI | 5    |

If we suppose a $50_{16}$ byte insertion as required between the MOV and INR instructions, the apparent patch code would be as follows:

|      | ORIGIN | 20F  |
|------|--------|------|
| 20F  | JMP    | 6000 |
|      | ORIGIN | 6000 |
| 6000 |        |      |
| 6050 | INR    | B    |
| 6051 | CMP    | M    |
| 6052 | JZ     | XXXX |
| 6055 | JMP    | 214  |

Two PROM patches would be generated, 200-200F, and 210-21F. $57_{16}$ bytes of Bulk Prom would be used. The map file 3010 would not change. The memory location file 3030 would indicate exclusive bulk PROM 170 from 600 to 61FF. Modified check sums might generate additional patches. It will be assumed that one check sum change and no other patches would be the case, where this sequence would require seven PROMS (2 level 1 + 1 level 2 + 2 PROM +2 bulk). An improved patch sequence would be:

|      | ORIGIN | 20D  |
|------|--------|------|
| 20D  | JMP    | 6000 |
|      | ORIGIN | 6000 |
| 6000 | DCR    | D    |
| 6001 | MOV    | A, M |
| 6002 | :      |      |
| 6052 | INR    | B    |
| 6053 | JMP    | 210  |

This sequence would generate one less PROM patch for patch PROM 180. The generated PROM patch would be from 200-20F. The area from 210-21F would not be patched. It would also use less bulk data PROM 170 ($55_{16}$ bytes). Assuming one check sum change, this sequence would also require seven PROMS. A third approach would be to treat location 1600-6055 a PROM data patches. Then there would be six additional PROM patches, 6000-605F. If this is the only patch then there would be no bulk PROM 170. If only one check sum is modified there would be only one level-1 decode PROM 750 and one level-2 decode PROM 920. There would be two patch PROMS. In total there would be four PROMS. Subsequent patch runs could move the 6000-605F area to Bulk PROM 170.

For inclusive Bulk PROM 170, it will be supposed that the current program range is 0-3FFF and that locations 1000-1081 are to be modified. The modifications would be made to the original source file 3060. If this were to be the only change, the patch program would have a null patch file 3040. The memory location file 3030 would specify inclusive Bulk PROM 170 from 1000-11FF. Level-1 decode PROM 750 would be generated. There would be no patch PROMS 180 (check sum changes would have occurred in the linker run) or Bulk PROM 170 generated. The Bulk PROM 170 memory image file 3000 would have been generated by the linker.

If the check sum locations and attributes in the map file 3010 in the memory location file 3030 matches the check sum locations and attributes in the map file 3010 used in the linker run, then the ARMS software support program 3005 will automatically generate patches for modified check sum values. If the check sum locations or their attributes have changed, the ARMS software support program 3005 will generate the new check sum values, but will not modify the old check sum values.

From the foregoing description of a specific system illustrating the fundamental features of the invention, it will now be apparent to those skilled in the art that the invention may be constructed in a variety of forms without departing from the true spirit and scope thereof. Accordingly, it is to be understood that the illustrated system disclosed herein is a preferred embodiment of the invention and that the invention is not to be limited thereby, but only by the appended claims.

What is claimed is:

1. A system for providing hierarchied auxiliary read-only memory in addition to read-only memory on-board a central processing unit module comprising:
   (a) memory means for providing a plurality of memory categories including permanent read-only memory and alterable programmable read-only memory for data storage in excess or in lieu of on-board read-only memory and for implementation and installation of changes to on-board read-only memory respectively; and
   (b) decoder means for recognition of addresses for accessing a given memory category of said memory means according to a predetermined hierarchy when the given accessing address falls within more than one or more overlapping subordinated address ranges for the memory categories of said memory means.

2. A hierarchied auxiliary memory system having structured ROM for use through a system bus as an adjunct to ROM on-board a central processing unit module for storage of instruction code comprising:
   (a) Contingent ROM memory means operatively coupled through the system bus to the central processing unit module for permanent storage of code in excess of or in lieu of that residing in the on-board ROM and said contingent ROM memory means;
   (b) Alterable PROM memory means operatively coupled through the system bus to the central processing unit module for storage of code implementation and installation of code changes to on-board ROM; and
   (c) Address Decoder means operatively coupled through the system bus to the central processing unit module for receipt of addresses therefrom for controlling the accessing of instruction code in said Contingency ROM memory means and said Alterable PROM memory means, and for ordered resolution according to a predetermined hierarchy for accessing precedence when memory ranges thereof overlap and therefore conflict by subordinating the former to the latter.

3. The hierarchied auxiliary memory system of claim 2 wherein said contingency ROM memory means comprises:
   (a) Address Buffer means operative to receive addresses on the system bus from the CPUM for signal driving and corrective biasing therefor for correlative matching of signal levels;
   (b) Permanent ROM storage means having addressing ranges that are transferably equivalent to ROM on board the CPUM and operative to receive driven address signals from said Address Buffer means for accessing instruction data sets mask stored therein in a plurality of partitions for transmittal on the system bus; and
   (c) Instruction multiplexer means operative to receive instruction data from more than one partition of said permanent ROM storage means for selection of a instruction data set from one of the presented partitions according to a predetermined code of addresses received on the system bus from the CPUM for transmittal through the system bus to the CPUM.

4. The hierarchied auxiliary memory system of claim 3 wherein said address buffer means comprises a plurality of gating means operative to receive each of the addresses separately on the system bus for the driving thereof, and a plurality of resistive means operative to receive each of the driven addresses separately for biasing thereof.

5. The hierarchied auxiliary memory system of claim 4 wherein each of said plurality of gating means is a positive logic And gate having commonly tied inputs.

6. The hierarchied auxiliary memory system of claim 4 wherein each of said plurality of resistive means is a resistive element having a controlled potential dropped across thereof.

7. The hierarchied memory system of claim 3 wherein said permanent ROM storage means comprises a quad of memory block means operative to receive the driven address signals for service as the memory partitions for use maximization of the limited input/output ports into the system bus for outputing a unique set of instruction data from each of said quad of memory block means.

8. The hierarched memory system of claim 7 wherein each of said quad of memory block means of said permanent ROM storage means include a plurality of mask programmable read-only-memory means each operative to receive a first portion of the driven addresses on the system bus at its addressing inputs and a second portion of the driven addresses on the system bus at its chip select inputs for unitary enabling thereof at any given time as accesses of instruction data onto the system bus.

9. The hierarched memory system of claim 7 wherein said instruction multiplexer means further includes a plurality of resistive means operative to receive each of the accessed instruction data separately on the system bus from said quad of memory block means for biasing thereof.

10. The hierarchied memory system of claim 9 wherein each of said plurality of resistive means is a resistive element having a controlled potential dropped across thereof.

11. The hierarchied memory system of claim 7 wherein said instruction multiplexer means further includes a pair of multiplexer block means each operative to receive a unique duality of accessed instruction data sets from said quad of memory block means for selective routing of one of the duality of accessed instruction data sets therethrough.

12. The hierarchied memory system of claim 11 wherein each of said pair of multiplexer block means further includes a pair of multiplexer means each operative to receive one part of each of the unique duality of accessed instruction data sets for alternative selection and strobed throughputing according to a subset of the driver address signals.

13. The hierarchied memory system of claim 3 further including address tri-state driver means operative to receive address signals on the system bus from the CPUM for output in a tri-state mode as driven signals for receipt by said address buffer means.

14. The hierarchied memory system of claim 13 wherein said address tri-state driver means is operative to have its control line grounded for continuous operation thereof.

15. The hierarchied memory system of claim 3 further including instruction tri-state driver means operative to receive an instruction data set from said instruction multiplexer means for output in a tri-state mode as biased driven signals on the system bus to the CPUM.

16. The hierarchied memory system of claim 15 wherein said instruction tri-state driver means is operative to have its control line enabled by receipt of a memory read signal on the system from the CPUM for enabled operation thereof.

17. The hierarchied auxiliary memory system of claim 2 wherein said alterable PROM memory means comprises:
   (a) Bulk PROM means operative to receive accessing addresses through the system bus from the central processing unit module for accessing instruction code programmably stored therein according to mutuality of address assigning for extensions, insertions, and large-scale overlay to code in board ROM and said contingency ROM memory means;
   (b) Patch PROM means operative to receive accessing addresses through the system bus from the central processing unit module for accessing instruction code programmably stored therein for single in-line bit pattern alterations through small-scale code overlay to code in the on-board ROM and said contingency ROM memory means.

18. The hierarchied auxiliary memory system of claim 17 wherein said patch PROM means further includes programmable read-only memory means operatively coupled to the system bus for storage of instruction code for transmittal upon command to the central processing module.

19. The hierarchied auxiliary memory system of claim 18 wherein said address decoding means further includes:
   (a) a first-level decoding means for partitioning the programmable read-only memory means of said patch PROM means into a predetermined finite number of locations, and operative to receive a first portion of the address on the system bus for selecting a unique location from the set of locations through the generation of a psuedo address therefor; and (b) second-level decoding means operative to receive the psuedo address from said first-level decoding means for pointing to a particular group as a subset of the selected location, and operative to receive a second portion of the address on the system bus for identifying a byte pointer to a multi-byte segment of the particular group for said patch PROM means.

20. The hierarchied auxiliary memory system of claim 19 wherein said second-level decoding means of said address decoding means further includes means operative to receive a third portion of the address on the system bus for pointing to a unitary byte to be selected from the multi-byte segment of the particular group for said patch PROM means.

21. The hierarchied auxiliary memory system of claim 19 wherein said first-level decoding means of said address decoding means further includes means operative upon receipt of an address on the system bus within the effective address range of said Bulk PROM means for generating a control signal representative thereof.

22. The hierarchied auxiliary memory system of claim 21 wherein said second-level decoding means further includes means for interpreting a predetermined bit position of the byte pointer to the multi-byte segment as indicating that the effective address range of said patch PROM means is being accessed for generating a control signal representative thereof, for generating a patch address set indicating a unique instruction data set to be accessed, and for generating a pair of control signals indicating the portion of said patch PROM means to be accessed by the patch address set.

23. The hierarchied auxiliary memory system of claim 21 wherein said unitary byte selection means of said second-level decoding means is further operative to hierarchically resolve conflicts as between signals from said first and second level decoding means indicating that the requesting address overlaps effective address ranges for both said bulk and patch PROM means by subordinating the former to the latter respectively.

24. The hierarchied auxiliary memory system of claim 22 wherein said programmable read-only memory means of said patch PROM means further includes a plurality of PROM means operative to receive the patch address set from said second-level decoding means for accessing one predetermined set thereof as selected by the pair of patch PROM portion control signals from said second-level decoding means for generation of an instruction set on the system bus.

25. The hierarchied auxiliary memory system of claim 17 wherein said bulk PROM means further includes:

(a) programmable read-only memory means operatively coupled to the system bus for storage of instruction code for transmittal upon command to the central processing unit module; and (b) address decoding means operatively coupled to receive address signals through the system bus from the central processing unit module for accessing instruction code from said programmable read-only memory means according to a mutuality of assigned addresses for charging the on-board ROM and said contingency ROM memory means.

26. The hierarchied auxiliary memory system of claim 25 wherein said address decoding means further includes means for specifying said programmable read-only memory means of said bulk PROM means into a predetermined address range area and designating a subset of these address range areas as address effective areas and for allowing one or more of the address effective areas to contain all or part of the instruction code.

27. The hierarchied auxiliary memory system of claim 25 wherein said address decoding means further includes means for instituting the mutuality of assigned addresses of said bulk PROM means in a mutually exclusive mode for extensions and insertions of code to on-board ROM.

28. The hierarchied auxiliary memory system of claim 25 wherein said address decoding means further includes means for instituting the mutuality of assigned addresses of said bulk PROM means in a mutually inclusive mode for large-scale code overlay on-board ROM.

29. The hierarchied auxiliary memory system of claim 25 further includes a patch memory means operatively coupled to the system bus for single in-line bit pattern alterations to read-only memory on-board the central processing unit module for allowing said programmable read-only memory means of said Bulk PROM means to be accessed through said address decoding means by addresses patched into the on-board ROM by said patch memory means.

30. The hierarchied auxiliary memory system of claim 27 wherein the mutually exclusive means of said address decoding means for said bulk PROM means acts to provide large-scale overlays of code to on-board ROM through branching of addresses.

31. The hierarchied auxiliary memory system of claim 28 wherein the mutually inclusive means of said address decoding means for said bulk PROM means acts to provide extension and insertions of code to on-board ROM through decoding of addressing.

32. The hierarchied auxiliary memory system of claim 26 wherein said specifying means of said address decoding means further includes means for constraining the access of all the instruction codes to be from one predetermined address effective area in said programmable read-only memory means of said bulk PROM means.

33. The hierarchied auxiliary memory system of claim 26 wherein said specifying means of said address decoding means further includes means for constraining access of all the instruction codes to be from more than one of the address effective areas in said programmable read-only memory means of said bulk PROM means.

34. The hierarchic auxiliary memory system of claim 25 wherein said programmable read-only memory means of said bulk PROM means further includes a plurality of PROM means operative to receive address signals on the system bus from the CPUM for accessing one predetermined set thereof as selected by the given address for generation of an instruction data set on the system bus.

35. The hierarchied auxiliary memory system of claim 34 wherein said programmable read-only memory means of said bulk PROM means further includes demultiplexer means operative to receive a predetermined portion of the address signals on the system bus from the CPUM for selecting the set of PROM means out of said plurality of PROM means to be chip enabled for addressing thereof.

36. The hierarchied auxiliary memory system of claim 35 wherein said demultiplexer means of said programmable read-only memory means of said bulk PROM means further includes means operative to receive a bulk PROM control signal from said address decoding means for allowing said demultiplexer means to chip enable a selected set of said plurality of PROM means, and operative to receive a patch PROM control signal from said address decoding means for hierarchically disabling and thereby subordinating the bulk PROM control signal.

37. The hierarchied auxiliary memory system of claim 19 wherein said first-level decoding means further includes a first pair of programmable read-only memory means operative to receive address signals on the system bus from the CPUM for decodably generating a psuedo address set to said second-level decoding means, and for generating a pair of control signals to said bulk PROM means and said contingency ROM storage means indicating that an access is required thereof respectively.

38. The hierarchied auxiliary memory system of claim 37 wherein said second-level decoding means further includes a second pair of programmable read-only memory means operative to receive the psuedo address set from said first pair of programmable read-only memory means for decodably generating a patch address set to said patch PROM means, and for generating a triad of control signals to said patch PROM storage means for selecting a first portion thereof, selecting a second portion thereof, and enabling thereof respectively.

39. The hierarchied auxiliary memory system of claim 38 wherein said first-level decoding means further includes gating means operative to receive the logical negation of the bulk PROM control signal, the logical positive of the contingency ROM control signal and the logical negation of the patch PROM control signal for throughputing upon concurrent receipt thereof, the contingency ROM control signal to said instruction multiplexer means for enabling thereof.

40. A contingency ROM storage module operatively coupled through a system bus to a CPUM having on-board ROM for permanent data storage of instruction code in excess of or in lieu of code in the on-board ROM comprising:
  (a) Address Buffer means operative to receive addresses on the system bus from the CPUM for signal driving and correcting biasing therefor for correlative matching of signal levels;
  (b) Permanent ROM storage means having addressing ranges that are transferably equivalent to ROM on board the CPUM and operative to receive driven address signals from said Address Buffer means for accessing instruction data sets mask stored therein in a plurality of partitions for transmittal on the system bus; and
  (c) Instruction multiplexer means operative to receive instruction data from more than one partition of said permanent ROM storage means for selection of a instruction data set from one of the presented partitions according to a predetermined code of addresses received on the system bus from the CPUM for transmittal through the system bus to the CPUM.

41. The contingency ROM storage module of claim 40 wherein said address buffer means comprises a plurality of gating means operative to receive each of the addresses separately on the system bus for the driving thereof, and a plurality of resistive means operative to receive each of the driven addresses separately for biasing thereof.

42. The contingency ROM storage module of claim 41 wherein each of said plurality of gating means is a positive logic and gating having commonly tied inputs.

43. The contingency ROM storage module of claim 41 wherein each of said plurality of resistive means is a resistive element having a controlled potential dropped across thereof.

44. The contingency ROM storage module of claim 40 wherein said permanent ROM storage means comprises a quad of memory block means operative to receive the driven address signals for service as the memory partitions for use maximization of the limited input-/output parts into the system bus for outputting a unique set of instruction data from each of said quad of memory block means.

45. The contingency ROM storage module of claim 44 wherein each of said quad of memory block means of said permanent ROM storage means include a plurality of mask programmable read-only-memory means each operative to receive a first portion of the driven addresses on the system bus at its addressing inputs and a second portion of the driven addresses or the system bus at its chip select inputs for unitary enabling thereof at any given time as accesses of instruction data onto the system bus.

46. The contingency ROM storage module of claim 44 wherein said instruction multiplexer means further includes a plurality of resistive means operative to receive each of the accessed instruction data separately on the system bus from said quad of memory block means for biasing thereof.

47. The contingency ROM storage module of claim 46 wherein each of said plurality of resistive means is a resistive element having a controlled potential dropped across thereof.

48. The contingency ROM storage module of claim 44 wherein said instruction multiplexer means further includes a pair of multiplexer block means each operative to receive a unique duality of accessed instruction data sets from said quad of memory block means for selective routing of one of the duality of accessed instruction data sets therethrough.

49. The contingency ROM storage module of claim 48 wherein each of said pair of multiplexer block means further includes a pair of multiplexer means each operative to receive one part of each of the unique duality of accessed instruction data sets for alternative selection and strobed throughputing according to a subset of the driver address signals.

50. The contingency ROM storage module of claim 40 further including address tri-state driver means operative to receive address signals in the system bus from the CPUM for output in a tri-state mode as driven signals for receipt by said address buffer means.

51. The contingency ROM storage module of claim 50 wherein said address tri-state driver means is operative to have its control line grounded for continuous operation thereof.

52. The contingency ROM storage module of claim 40 further including instruction tri-state driver means operative to receive an instruction data set from said instruction multiplexer means for output in a tri-state mode as biased driven signals on the system bus to the CPUM.

53. The contingency ROM storage module of claim 52 wherein said instruction tri-state driver means is operative to have its control line enabled by receipt of a memory read signal on the system from the CPUM for enabled operation thereof.

54. An alterable PROM storage module operatively coupled through a system bus to a central processing unit module having on-board ROM for programmable data storage of insturction code for implementation and installation of changes to the on-board ROM code comprising:
 (a) Bulk PROM means operative to receive accessing addressing through the system bus from the central processing unit module for accessing instruction code programmably stored therein according to mutuality of address assigning for extensions, insertions, and large-scale overlay to code in on-board ROM;
 (b) Patch PROM means operative to receive accessing addresses through the system bus from the central processing unit module for accessing instruction code programmably stored therein for single in-line bit pattern alterations through small-scale code overlay to code in on-board ROM; and
 (c) address decoding means operatively coupled to receive address signals through the system bus from the central processing unit module for accessing instruction code from said bulk PROM means according to a mutuality of assigned addresses for changing on-board ROM, and for accessing instruction code from said patch PROM means as single in-line bit pattern alterations to the on-board ROM, said address decoding means further includes:
  (1) first-level decoding means for partitioning said patch PROM means into a predetermined finite number of locations, and operative to receive a first portion of the address on the system bus for selecting a unique location from the set of locations through the generation of a psuedo address therefor; and
  (2) second-level decoding means operative to receive the psuedo address from said first-level decoding means for pointing to a particular group as a subset of the selected location, and operative to receive a second portion of the address on the system bus for identifying a byte pointer to a multi-byte segment of the particular group.

55. The patch memory system of claim 54 wherein said second-level decoding means of said address decoding means further includes means operative to receive a third portion of the address on the system bus for pointing to a unitary byte to be selected from the multi-byte segment of the particular group for said patch PROM means.

56. The Alterable PROM storage module of claim 54 wherein said first-level decoding means of said address decoding means further includes means operative upon receipt of an address on the system bus within the effective address range of said bulk PROM means for generating a control signal representative thereof.

57. The Alterable PROM storage module of claim 56 wherein said second-level decoding means further includes means for interpreting a predetermined bit position of the byte pointer to the multi-byte segment as indicating that the effective address range of said patch PROM means is being accessed for generating a control signal representative thereof, for generating a patch address set indicating a unique instruction data set to be accessed; and for generating a pair of control signals indicating the portion of said bulk PROM means to be accessed by the patch address set.

58. The Alterable PROM storage module of claim 56 wherein said unitary byte selection means of said second-level decoding means is further operative to hierarchically resolve conflicts as between control signal from said first and second level decoding means indicating that the requesting address overlaps effective address ranges for both said bulk and patch PROM means where the former is subordinated to the latter respectively.

59. A memory system for providing programmable extensions, insertion, and large-scale overlay to bulk code through a system bus to ROM on board a central processing unit module comprising:
 (a) programmable read-only memory means operatively coupled to the system bus for storage of instruction code for transmittal upon command to the central processing unit module; and
 (b) address decoding means operatively coupled to receive address signals through the system bus from the central processing unit module for accessing instruction code from said programmable read-only memory means according to a mutuality of assigned addresses for changing on-board ROM, wherein said address decoding means further includes means for specifying said programmable read-only memory means into a predetermined address range area and designating a subset of these address range areas as address effective areas, and for allowing one or more of the address effective areas to contain all or part of the instruction code.

60. A memory system for providing programmable extensions, insertion, and large-scale overlay of bulk code through a system bus to ROM on board a central processing unit module comprising:
 (a) programmable read-only memory means operatively coupled to the system bus for storage of instruction code for transmittal upon command to the central processing unit module; and
 (b) address decoding means operatively coupled to receive address signals through the system bus from the central processing unit module for accessing instruction code from said programmable read-only memory means according to a mutuality of assigned addresses for changing on-board ROM, wherein said address decoding means further includes means for instituting the mutuality of assigned addresses in a mutually exclusive mode for extensions and insertions of code to on-board ROM.

61. A memory system for providing programmable extensions, insertion, and large-scale overlay of bulk code through a system bus to ROM on board a central processing unit module comprising:
 (a) programmable read-only memory means operatively coupled to the system bus for storage of instruction code for transmittal upon command to the central processing unit module; and
 (b) address decoding means operatively coupled to receive address signals through the system bus from the central processing unit module for accessing instruction code from said programmable read-only memory means according to a mutuality of assigned addresses for changing on-board ROM, wherein said address decoding means further includes means for instituting the mutuality of assigned addresses in a mutually inclusive mode for large-scale code overlay on-board ROM.

62. A memory system for providing programmable extensions, insertion, and large-scale overlay of bulk code through a system bus to ROM on board a central processing unit module comprising:
 (a) programmable read-only memory means operatively coupled to the system bus for storage of instruction code for transmittal upon command to the central processing unit module;
 (b) address decoding means operatively coupled to receive address signals through the system bus from the central processing unit module for accessing instruction code from said programmable read-only memory means according to a mutuality of assigned addresses for changing on-board ROM; and
 (c) patch memory means operatively coupled to the system bus for single in-line bit pattern alterations to read-only memory on-board the central processing unit module for allowing said programmable read-only memory means to be accessed through said address decoding means by addresses patched into the on-board ROM by said patch memory means.

63. The bulk memory system of claim 60 wherein the mutually exclusive means of said address decoding means acts to provide large-scale overlays of code to on-board ROM through branching of addresses.

64. The bulk memory system of claim 61 wherein the mutually inclusive means of said address decoding means act to provide extension and insertions of code to on-board ROM through decoding of addressing.

65. The bulk memory system of claim 59 wherein said specifying means of said address decoding means further includes means for constraining the access of all the instruction code to be from one predetermined address effective area in said programmable read-only memory means.

66. The bulk memory system of claim 59 wherein said specifying means of said address decoding means further includes means for constraining access of all the instruction codes to be from more than one of the address effective areas in said programmable read-only memory means.

67. A memory system for providing programmable small-scale overlay patches to a system bus read-only memory on board a central processing unit module for single-in-line-bit pattern alterations through a system bus to a central processing unit module comprising:
 (a) programmable read-only memory means operatively coupled to the system bus for storage of instruction code for transmittal upon command to the central processing module; and
 (b) address decoding means operatively coupled to receive address signals through the system bus from the central processing unit module for accessing instruction code from said programmable read-only memory means as single-in-line-bit pattern alterations to the on-board ROM, wherein said address decoding means further includes:
  (1) first-level decoding means for partitioning the programmable read-only memory into a predetermined finite number of locations, and operative to receive a first portion of the address on the system bus for selecting a unique location from the set of locations through the generation of a psuedo address therefor; and
  (2) second-level decoding means operative to receive the psuedo address from said first-level decoding means for pointing to a particular group as a subset of the selected location, and operative to receive a second portion of the address on the system bus for identifying a byte pointer to a multi-byte segment of the particular group.

68. The patch memory system of claim 67 wherein said second-level decoding means of said address decoding means further includes means operative to receive a third portion of the address on the system bus for pointing to a unitary byte to be selected from the multi-byte segment of the particular group.

* * * * *